United States Patent
Koyama et al.

(10) Patent No.: US 6,774,352 B2
(45) Date of Patent: Aug. 10, 2004

(54) MULTI-BEAM PHOTOELECTRIC SENSOR AND ITS MOUNT

(75) Inventors: Masatoshi Koyama, Osaka (JP); Tomikazu Sakaguchi, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 10/310,649

(22) Filed: Dec. 5, 2002

(65) Prior Publication Data

US 2003/0106992 A1 Jun. 12, 2003

(30) Foreign Application Priority Data

Dec. 12, 2001 (JP) .......................... 2001-378500
Sep. 20, 2002 (JP) .......................... 2002-275138

(51) Int. Cl.[7] .................................. G06M 7/00
(52) U.S. Cl. ................. 250/221; 250/239; 340/555
(58) Field of Search ...................... 250/221, 222.1, 250/239; 340/555, 556, 557

(56) References Cited

U.S. PATENT DOCUMENTS

| | | | |
|---|---|---|---|
| 5,003,169 A | 3/1991 | Sakaguchi et al. | 250/221 |
| 5,198,661 A | 3/1993 | Anderson et al. | 250/221 |
| 6,140,633 A | 10/2000 | Iwasaki et al. | 250/221 |
| 6,166,371 A | 12/2000 | Milbrath et al. | 250/221 |
| 6,294,777 B1 | 9/2001 | Shteynberg et al. | 250/221 |
| 2003/0116697 A1 * | 6/2003 | Kuhar | 250/221 |

FOREIGN PATENT DOCUMENTS

| | | | |
|---|---|---|---|
| JP | 10074433 | 3/1998 | |
| JP | 2000251595 | 9/2000 | |
| WO | WO 00/54077 | 9/2000 | G01V/8/20 |

* cited by examiner

Primary Examiner—Stephone B. Allen
(74) Attorney, Agent, or Firm—Kilyk & Bowersox, P.L.L.C

(57) ABSTRACT

A multi-beam photoelectric sensor (10) includes a light emitter and a photo detector each having an elongate casing (13). At least one of opposite lengthwise ends of the casing (13) is configured to receive a cable (53) for electric coupling. The casing (13) has a mount (20) located around its back surface within the length of the casing (13) to fix the casing (13) to an external structure.

22 Claims, 19 Drawing Sheets

MULTI-BEAM PHOTOELECTRIC SENSOR AND ITS MOUNT

BACKGROUND OF THE INVENTION

1. Field of the Invention

This invention relates to a multi-beam photoelectric sensor and its mount.

2. Discussion of the Related Art

Multi-beam photoelectric sensors disclosed in U.S. Pat. No. 6,166,371, International Publication No. WO 00/54077 and Japanese Patent Laid-Open Publication No. 2000-251595 each include units of paired light emitters and photo detectors to make a protective fence, typically called a light curtain, of a desired size by using one or more units of light emitters and photo detectors. Multi-beam photoelectric sensors of this type are widely used for prohibiting intrusion of any part of a worker's body or any other object into a prohibited zone around a work area with a machine tool, press machine, etc.

Multi-beam photoelectric sensors typically need positioning of light emitters and photo detectors in an opposed relation upon their initial setup, and need adjustment of optical axes between light emitters and photo detectors. Adjustment of optical axes includes rotation of light emitters and/or photo detectors about their own axes. Light emitters and/or photo detectors can be adjusted in rotational orientation by appropriate amounts of rotation.

FIG. 1 and FIG. 2 show examples of existing mount for multi-beam photoelectric sensors. In each of these examples, the multi-beam photoelectric sensor 1 includes a plurality of through holes 3 aligned in a single row in equal intervals on the light emitting or detecting surface that is the front surface of a body 2. The multi-beam photoelectric sensor 1 exchanges equally spaced light beams through these holes.

The multi-beam photoelectric sensor 1 is fixed on a support (not shown), which is an external structure like a frame of a press machine, via a bracket 4. In the example of FIG. 1, the bracket 4 includes a base member 5 and a plate member 6. The plate member 6 is firmly fixed to the base member 5 by bolts 7. The bracket 4 defines a shaft hole between the base member 5 and the plate member 6 to receive a shaft 17 having a circular section and axially extending from top and bottom ends of the sensor body 2. When the bolts 7 are rotated in the fastening direction, the multi-beam photoelectric sensor 1 is fixed to the bracket 4 and prevented from relative rotation. When the bolts 7 are loosened, the multi-beam photoelectric sensor 1 can rotate about the axis.

In the example of FIG. 2, the bracket 4 is a member having an L-shaped section, which includes a base portion 8 for engagement with the support and a sensor mount portion 9 extending perpendicularly to the base portion 8. The base portion 8 has elongate holes 10 longer in the axial direction of the multi-beam photoelectric sensor 1 to enable adjustment of the multi-beam photoelectric sensor 1 in its axial position.

The sensor mount portion 9 of the bracket 4 has a round hole 11 for receiving the shaft 17 of the sensor 1, and a plurality of elongated arcuate holes about the round hole 11. The sensor 1 is fixed to the bracket 4 by bolts (not shown) inserted through the arcuate holes 12.

In the existing example shown in FIG. 2, when the bolts in the arcuate holes 12 are rotated in the releasing direction, the sensor 1 is permitted to rotate about its axis. When the bolts are rotated in the fastening direction, the sensor 1 is fixed no to be rotatable about the axis. That is, the sensor 1 is fixed in rotational orientation.

In any of the existing examples shown in FIGS. 1 and 2, when a plurality of multi-beam photoelectric sensors 1 are used together in straight or angled connection to make a large light curtain, it is practically impossible to make a light curtain without a large gap between the nearest light beams of every two adjacent sensors 1, 1. That is, it is practically impossible to place the adjacent sensors 1, 1 such that the pitch between the extreme light beam of one sensor 1 and the nearest light beam of another sensor 1 equals the pitch of the light beams within each sensor 1.

Additionally, the existing example of FIG. 2 involves the problem that the adjustable extent of the sensor 1 in its rotating direction is substantially limited by the length of each arcuate hole 12. Therefore, the sensor 1 can be adjusted in rotational orientation only within a limited range.

SUMMARY OF THE INVENTION

It is therefore an object of the invention to provide a multi-beam photoelectric sensor and its mount of a scheme different from existing ones.

A further object of the invention is to provide a multi-beam photoelectric sensor and its mount that are capable of connecting a plurality of multi-beam photoelectric sensors substantially in direct contact and suitable for placing a plurality of multi-beam photoelectric sensors such that the pitch of light beams between adjacent multi-beam photoelectric sensors equals the pitch of light beams within each multi-beam photoelectric sensor.

A still further object of the invention is to provide a multi-beam photoelectric sensor and its mount that are designed to facilitate enlargement of the rotatable angle of the multi-beam photoelectric sensor, that is, the adjustable extent of its rotational orientation.

Those objects of the invention can be accomplished by various aspects of the invention.

According to an aspect of the invention, there is provided a multi-beam photoelectric sensor comprising:

a light emitter having a plurality of light emitting elements aligned in equal intervals in the lengthwise direction of an elongate casing inside the elongate casing;

a photo detector having a plurality of photo detector elements aligned in the same equal intervals as those of the light emitting elements in the lengthwise direction of an elongate casing inside the elongate casing;

a cable connected to at least one of lengthwise ends of the casing of the light emitter to supply an electric power and/or transmit a signal;

a cable connected to at least one of lengthwise ends of the casing of the photo detector to supply an electric power and/or transmit a signal;

a light emitter mounting means for mounting the casing of the light emitter to a support, said light emitter mounting means being positioned on a back surface of the casing of the light emitter opposite from a light emitting surface from which the light emitting elements emit light beams; and a photo detector mounting means for mounting the casing of the photo detector to a support, said photo detector mounting means being positioned on a back surface of the casing of the photo detector opposite from a photo-detecting surface where the photo detector elements receive light beams.

In the multi-beam photoelectric sensor summarized above, at least one of the light emitter mounting means and the photo detector mounting means preferably includes means for adjusting the corresponding elongate casing in rotational angular position about a lengthwise axis thereof. Adjustment of optical axes is to adjust relative orientations of the light emitter and the photo detector, and it can be accomplished by adjusting at least one of the light emitter and the photo detector in its orientation.

According to another aspect of the invention, there is provided a multi-beam photoelectric sensor comprising:

- a light emitter having a plurality of light emitting elements aligned in equal intervals in the lengthwise direction of an elongate casing inside the elongate casing;
- a photo detector having a plurality of photo detector elements aligned in the same equal intervals as those of the light emitting elements in the lengthwise direction of an elongate casing inside the elongate casing;
- a light emitter mounting means for mounting the casing of the light emitter to a support, said light emitter mounting means being positioned on a back surface of the casing of the light emitter opposite from a light emitting surface from which the light emitting elements emit light beams;
- a photo detector mounting means for mounting the casing of the photo detector to a support, said photo detector mounting means being positioned on a back surface of the casing of the photo detector opposite from a photo-detecting surface where the photo detector elements receive light beams;
- said light emitter mounting means and said photo detector mounting means including rotational position adjusting means for adjusting rotational angular positions of the light emitter and the photo detector; and
- said light emitter mounting means and said photo detector mounting means including lengthwise position adjusting means for adjusting lengthwise positions of the light emitter and the photo detector.

According to another aspect of the invention, there is provided a mount for mounting one of a light emitter and a photo detector of a multi-beam photoelectric sensor to a support, said light emitter having a plurality of light emitting elements aligned in equal intervals in the lengthwise direction of an elongate casing inside the elongate casing and said photo detector having a plurality of photo detector elements aligned in the same equal intervals as those of the light emitting elements in the lengthwise direction of an elongate casing inside the elongate casing, comprising:

- said casing having an arcuate portion which projects outwardly at least around the back surface of the circumferential surface of the casing excluding the front surface of the casing;
- said mount including a first member and a second member positioned to hold the arcuate portion of the casing therebetween; and
- said first member and said second member including fastening means capable of tightly joining each other.

According to another aspect of the invention, there is provided a mount for mounting one of a light emitter and a photo detector of a multi-beam photoelectric sensor to a support, said light emitter having a plurality of light emitting elements aligned in equal intervals in the lengthwise direction of an elongate casing inside the elongate casing, and said photo detector having a plurality of photo detector elements aligned in the same equal intervals as those of the light emitting elements in the lengthwise direction of an elongate casing inside the elongate casing, comprising:

- said casing having an arcuate portion which extends perpendicularly to the lengthwise direction of the casing, said arcuate portion having opposite side surfaces which define the arcuate portion in the lengthwise direction of the casing and form first slanting surfaces sloping down toward the inner circumferential surface thereof;
- said mount having a rectangular opening which partly receives the arcuate portion of the multi-beam photoelectric sensor, opposite side surfaces of the rectangular opening being second slanting surfaces slanted with a complementary angle with the first slanting surfaces of the arcuate portion; and
- said mount having a stopper for urging the arcuate portion from the back surface thereof.

According to another aspect of the invention, there is provided a mount for mounting one of a light emitter and a photo detector of a multi-beam photoelectric sensor to a support, said light emitter having a plurality of light emitting elements aligned in equal intervals in the lengthwise direction of an elongate casing inside the elongate casing, and said photo detector having a plurality of photo detector elements aligned in the same equal intervals as those of the light emitting elements in the lengthwise direction of an elongate casing inside the elongate casing, comprising:

- a first member which can be fixed to the support;
- a second member which is positioned behind the back surface of the casing and can be fixed to the support; and
- a third member which can be affixed to the casing to extend in an arcuate form around the back surface of the casing,
- wherein opposite side surfaces of the arcuate third member are first slanting surfaces sloping down toward the inner circumferential surface thereof,
- wherein the second member has a rectangular opening for partly receiving the arcuate third member, opposed sidewalls defining the rectangular opening are second slanting surfaces slanted by a complementary angle with the first slanting surfaces, and
- wherein the first member includes a stopper which exerts an urging force to the back surface of the arcuate third member, and
- wherein the casing can be adjusted in rotational angle about a lengthwise axis thereof by reducing the urging force of the stopper to the third member even after the casing is fixed to the external structure by the mount.

According to another aspect of the invention, there is provided a mount for mounting one of a light emitter and a photo detector of a multi-beam photoelectric sensor to a support, said light emitter having a plurality of light emitting elements aligned in equal intervals in the lengthwise direction of an elongate casing inside the elongate casing, the elongate casing having lengthwise grooves in opposite side surfaces thereof, and said photo detector having a plurality of photo detector elements aligned in the same equal intervals as those of the light emitting elements in the lengthwise direction of an elongate casing inside the elongate casing, the elongate casing having lengthwise grooves in opposite side surfaces thereof, comprising:

- a base member which can be fixed to the support;
- an elongate member extending around the back surface of the casing perpendicularly to the lengthwise direction of the casing;

guide means formed as a part of the base member to engage with the elongate member and guide rotation of the casing about a lengthwise axis thereof;

a stopper member supported by the base member to engage with the elongate member; and an operation member capable of releasing the engagement of the stopper with the elongate member, wherein the casing can be adjusted in rotational position by manually operating the operation member and thereby reducing the engagement force between the stopper member and the elongate member.

According to another aspect of the invention, there is provided a multi-beam photoelectric sensor comprising:

a light emitter having a plurality of light emitting elements contained in an elongate casing and aligned in the lengthwise direction of the casing in equal intervals;

a photo detector having a plurality of photo detector elements contained in an elongate casing and aligned in the lengthwise direction of the casing in substantially the same equal intervals as those of the light emitting elements;

a light emitter mounting means positioned within the full length of the light emitter casing for fixing the light emitter casing to an external structure; and a photo detector mounting means within the full length of the casing for fixing the photo detector casing to an external structure.

These and other objects and advantages of the invention will appear clearly from the following description of preferred embodiments.

DETAILED DESCRIPTION OF THE INVENTION

Figure 1:
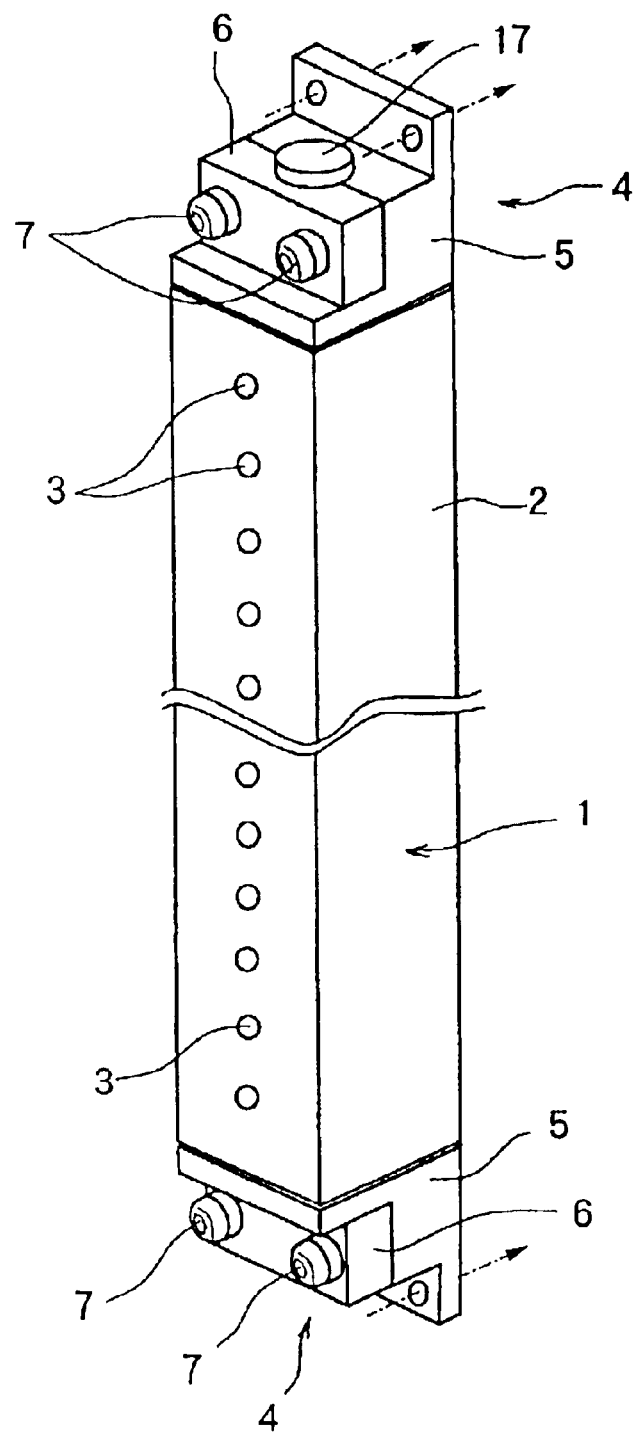
FIG. 1 is a perspective view that shows an existing example of mounting a multi-beam photoelectric sensor to a support.
Figure 2:
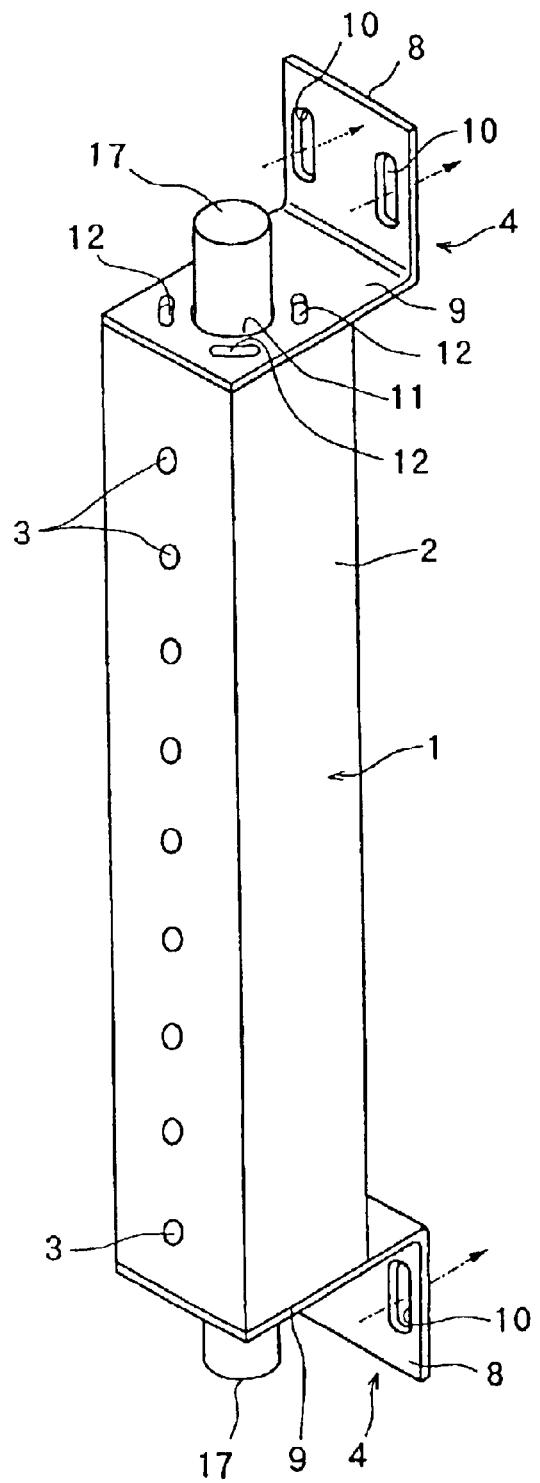
FIG. 2 is a perspective view that shows another existing example of mounting a multi-beam photoelectric sensor to a support.

Preferred embodiments of the invention will now be explained below with reference to the drawings.

First Embodiment (FIGS. 3 through 11)

A multi-beam photoelectric sensor (hereinafter simply called a sensor as well) 10 has a plurality of through holes appearing on its front surface 11. The through holes 12 are aligned in a single row in equal intervals. The sensor 10 includes a casing 13 that may be formed by extrusion molding. The casing 13 contains optical units (not shown) including light emitting elements and photo detector elements that exchange light beams through the holes 12. That is, the sensor 10 shown here may be either a light emitter for emitting light beams through the holes 12 aligned along the light emitting surface or a photo detector for receiving light beams through the holes 12 aligned along the light-receiving surface. The numbers or placement of the holes 12 is not limited to the illustrated example, but more holes 12 may be aligned up to locations nearer to lengthwise terminal ends of the casing 13, for example.

The casing 13 includes a pair of sidewalls 14 opposed to each other and a bottom or back 15 connecting these two sidewalls 14. The sidewalls 14 are preferably parallel with each other. The bottom or back 15 is preferably shaped arcuate in its section as illustrated, although this is not limitative.

Each of the sidewalls 14 has a groove extending straight in the lengthwise direction of the casing 13. The groove 16 may be formed simultaneously when the casing 13 is molded, or may be formed by secondary machining after the casing 13 is molded.

Figure 3:
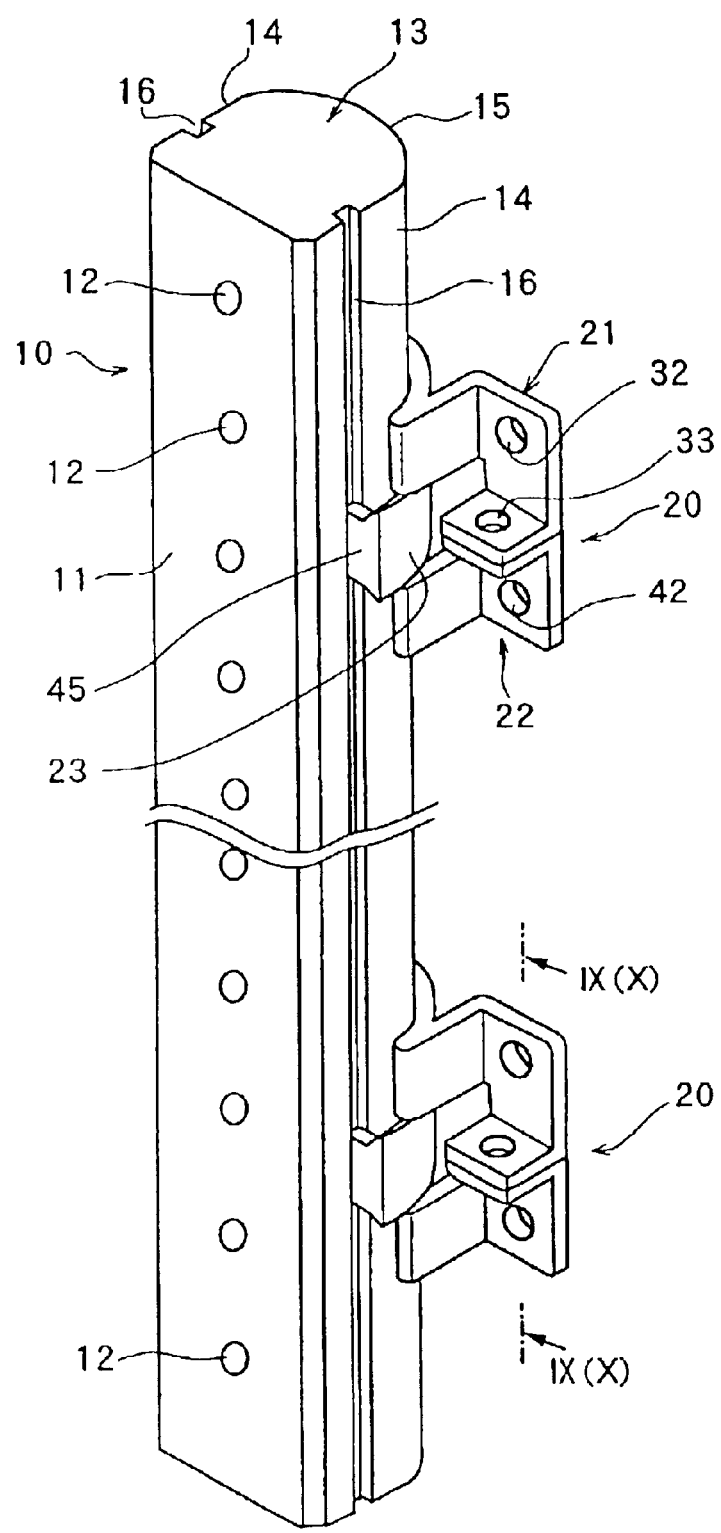
FIG. 3 is a perspective view that shows a fixture method and a mount according to the fist embodiment of the invention.

In the illustrated example, as best shown in FIG. 3, each groove 16 extends to the full length of the casing 13. Instead, however, it may be formed to partly extend in the sidewall 14 of the casing 13.

In FIG. 3, for example, reference numeral 20 denotes a mount for fixing the sensor 10 to a support (not shown). The mount 20 illustrated here is composed of three members 21 through 23 as readily understood from FIG. 4. The first member 21 and the second member 22 form a mount base means for fixing the mount 20 to a support (not shown). Additionally, the first and second members 21, 22 form a fastening means for fixing the third member 23.

The first member 21 a semi-circular ring or central portion 24 curved to fit the bottom or back 15 of the casing 13. In greater detail, the central portion 24 is curved to exhibit the form of an elongate semi-circular ring, and as shown in FIG. 5, it has an inner circumferential surface 25, outer circumferential surface 26 and two side surfaces 27, 28.

The first member 21 further includes a pair of flat rise portions extending back from opposite ends of the central portion 24, support-engaging portions 30 that are flat portions bent and extended outwardly from distal ends of the rise portions 29, and flanges 31 that are flat portions each bent and extended from one end of each support-engaging portion 30 (one end nearer to the second member 22). The support-engaging portions 30 and the flanges 31 have bolt holes 32, 33.

The second portion 22 is shaped substantially identically to the first member 21. That is, the second portion 22 has a central portion 34, rise portions 35, support-engaging portions 36 and flanges 37 that corresponding to the central portion 24, rise portions 29, support-engaging portions 30 and flanges 31 of the first member 21. Similarly to the first member 21, the central portion 34 of the second portion 22 has an inner circumferential surface 38, outer circumferential surface 39, and two side surfaces 40, 41. Similarly to the first member 21, the support-engaging portions 36 and the flanges of the second member 22 have bolt holes 42, 43.

Figure 5:
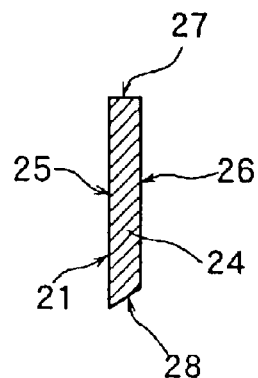
FIG. 5 is a longitudinal cross-sectional view of a first member taken along the V—V lone of FIG. 4.
Figure 6:
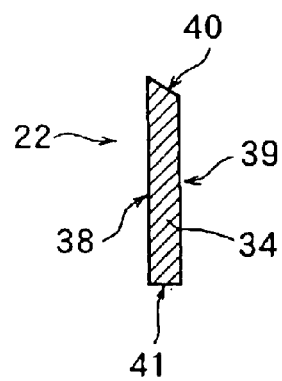
FIG. 6 is a longitudinal cross-sectional view of a second member taken along the VI—VI line of FIG. 4.

As more clearly shown in FIGS. 5 and 6, the opposed side surfaces 28, 40 of the central portion 24 of the first member 21 and the central portion 34 of the second member 22 are slanted to slope down from the back surfaces toward the inner circumferential surfaces. As a modified configuration, only one of the side surfaces 28, 40, namely the side surface 28 of the first member 21 or the side surface 40 of the second member 22 may be slanted in this manner.

The third member 23 includes a central portion or main portion 44 that is arcuate similarly to the central portion 24 of the first member 21, etc., and claw portions 45 inwardly projecting from opposite ends of the main portion 44. The third member 23 is symmetrical between its right and left halves and between its upper and lower halves. The length L of each claw portion 45 (FIG. 4) is substantially longer than the depth of the groove 16 of the casing 13.

Figure 7:
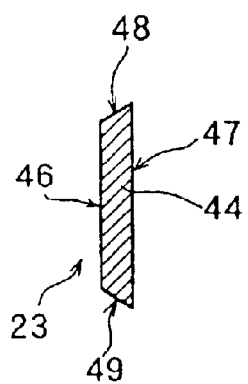
FIG. 7 is a longitudinal cross-sectional view of a third member taken along the VII—VII line of FIG. 4.

As best shown in FIG. 7, the central or main portion 44 of the third member 23 has an inner circumferential surface 46, outer circumferential surface 47 and two side surfaces 48, 49. These two side surfaces 48, 49 are slanted to slope down from the inner circumferential surface toward the back surface oppositely from the slanted surfaces 28, 40 of the first and second members 21, 22. If the side surface 28 of the central portion 24 of the first member 21 is slanted whereas the side surface 40 of the central portion 34 of the second member is not slanted, it is recommended to slant only one of the side surfaces 48, 49 of the central portion 44 of the third member 23 by a complementary angle without slanting the other.

FIG. 3 illustrates the sensor 10 fixed to a support (not shown) by using two mounts 20. When the support-engaging portions 30, 36 of the first and second members 21, 22 are put in contact with the support, and bolts (not shown) inserted through the bolt holes 32, 42 are fastened, the first and second members 21, 22 can be fixed to the support. The bolt holes 32, 42 may be elongate holes extending vertically on FIG. 3. When the bolt holes 32, 42 are elongate holes longer in the axial direction of the sensor 10, then the sensor 10 can be adjusted in vertical position, i.e. lengthwise position, by adjusting the fastened position of the bolts in the bolt holes 32, 42.

The third member 23 is mounted on the sensor 10 with the pair of claw portions 45 of the third member 23 being inserted in the grooves 16 of the casing sidewalls 14. Thus the third member 23 can be united with the sensor 10. In case of the illustrated embodiment in which the grooves 16 extend over the full length of the casing 13, the third member 23 can be mounted more easily because the claw portions 45 of the third member 23 can be easily inserted in the grooves 16 from one end of the casing 13.

Figure 4:
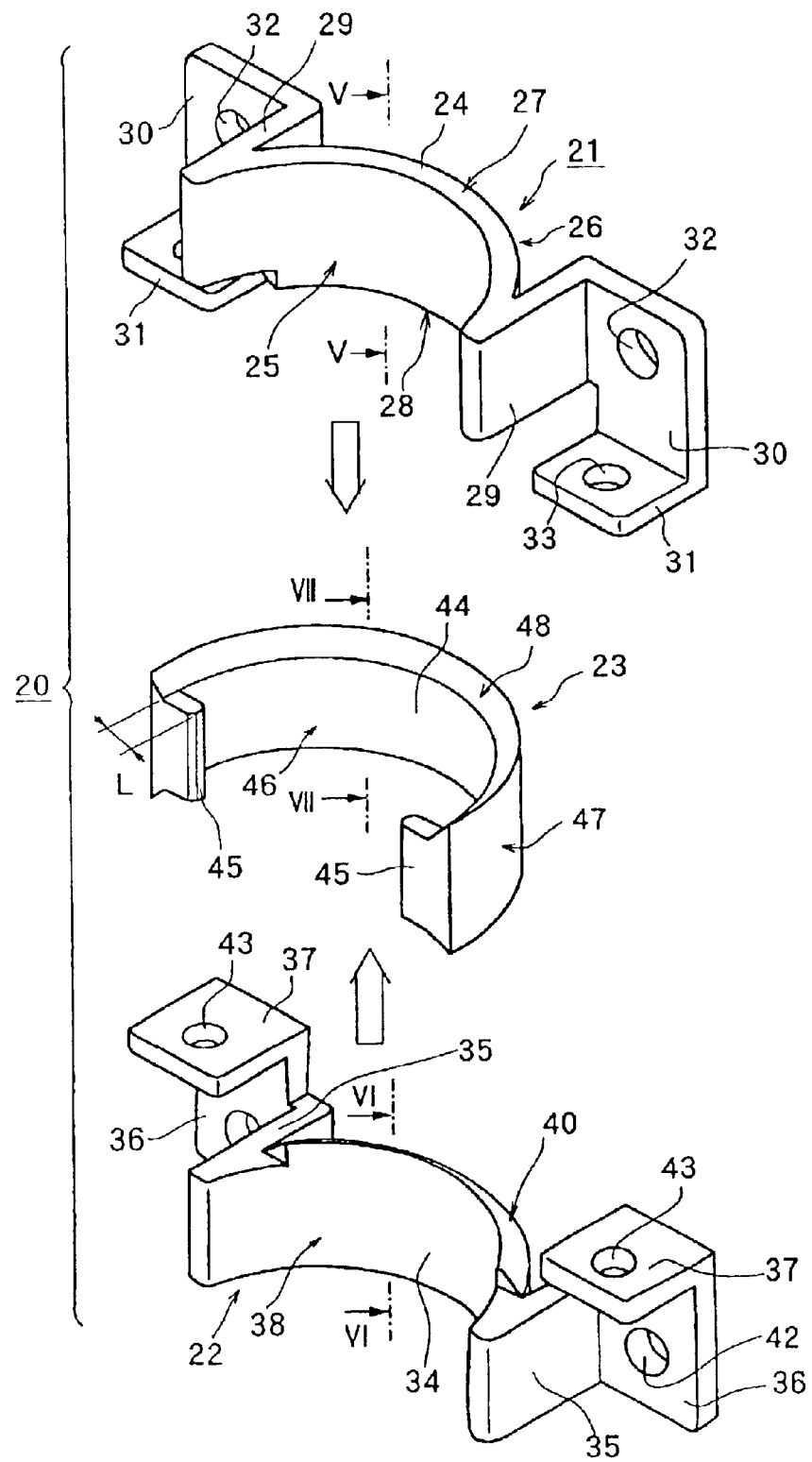
FIG. 4 is an exploded perspective view of the mount according to the first embodiment.

As shown in FIGS. 3 and 4, the third member 23 is positioned and tightly held between the first member 21 and the second member 22 on the back of the sensor 10. More specifically, the first, second and third members 21, 22, 23 are positioned such that the side surfaces 48, 49 of the third member 23 get into contact with side surfaces 28, 40 of the first and second members 21, 22 respectively. Preferably, therefore, the opposed surfaces 48, 28 and the other opposed surfaces 49, 40 are tapered by complementary angles. Once the relative positions of the first, second and third members 21, 22, 23 are determined, the flanges 31 of the first member 21 and the flanges 37 of the second member 22 overlap one another. Then, when bolts 50 (see FIGS. 8 and 9) are inserted through the bolt holes 33 of the flanges 31, 37 and fastened by nuts, it substantially results in tightly holding the third member 23 between the first member 21 and the second member 22. Instead of using the nuts, a screw thread may be cut into the inner surface of each bolt hole 33, 43 to use only bolts or screws for the fastening. When the bolts 50 are tightly fastened, which is herein called the first mode, the flanges 31 of the first member 21 and the flanges 37 of the second member 22 are brought closer, and the distance between the first member 21 and the second member 22 decreases.

As already explained, the side surfaces 48, 49 of the third member 23 and the side surfaces 28, 40 of the first and second members 21, 22 are tapered by complementary angles, and the side surfaces of the third member 23 are tapered to become thinner toward the inner circumferential surface. Therefore, as the distance between the first member 21 and the second member 22 decreases, the central portion, i.e. main portion, 44 of the third member 23 tends to be urged outwardly, and this results in narrowing the distance of the pair of claw portions 45, 45. Thus, the claw portions 45 of the third member 23 firmly engage the grooves 16 of the casing 13, and integrality of the third member 23 with the casing 13 is enhanced.

Figure 11:
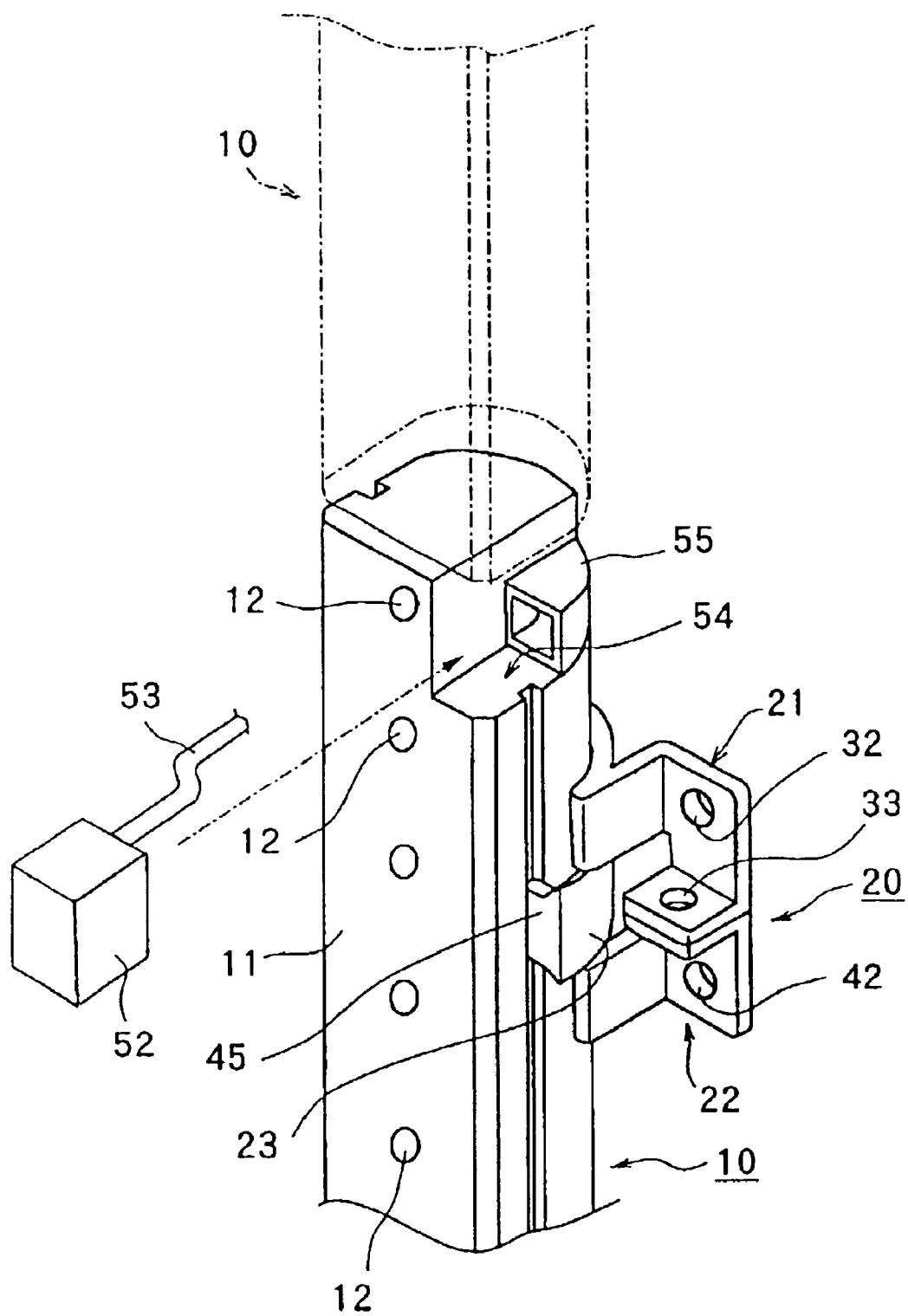
FIG. 11 is a diagram illustrating an example of serial connection of the multi-beam photoelectric sensor employed in explanation of the first embodiment with another multi-beam photoelectric sensor with a cable.

As such, the sensor 10 can be firmly fixed to a support at the back thereof by the mount 20 in the first mode. Therefore, in case a plurality of sensors 10 are used in connection, for example, they can be connected together, putting their opposed ends substantially in direct contact as shown in FIG. 11. In FIG. 11, reference numeral 52 denotes a connector. The sensor 10 is electrically connected to one or more adjacent sensors or a controller, not shown, by using a cable extending from the connector 52 to enable the supply of electric power and/or transmission of signals.

In regard to location of the connector, various configurations are possible and acceptable. However, a recess or cutout 54 is preferably formed in one or each end of the casing 13 to receive the connector 52 inside. In this case, when the connector 52 is inserted in the recess 54 from the front toward the back of the casing 13 and sits in position for connection to the sensor 10, the outer shell of the connector preferably forms a part of the casing 13 such that the outer surface of the sensor 10 becomes substantially level.

Alternatively, the connector 52 may be inserted from one end surface of the casing 13 or from the back toward the front of the casing 13 for connection to the sensor 10. As already explained, if the cable 53 is connected to one end of the sensor 10, the mount 20 is preferably positioned not to interfere with the cable 53.

For adjusting the rotational orientation of the sensor 10, the bolts 50 fastening the flanges 31 of the first member 21 and the flanges 37 of the second member 22 may be loosened. This is called the second mode. Once the bolts 50 are loosened, the flanges 31 of the first member 21 and the flanges 37 of the second member 22 tend to be spaced apart, and the first member 21 and the second member 22 tend to be slightly spaced apart. As a result, the fastening force to the third member 23 from the first and second members 21, 22 is reduced, and the sensor 10 is allowed to rotate about its axis together with the third member 23 over a wide range. That is, the sensor can be freely adjusted in angular position, i.e. rotational orientation. Preferably, the change of the angular position of the sensor 10 is possible about its axis. Once the sensor 10 is brought to a desired rotational orientation, the bolts 50 are again fastened to restore the first mode. Thus the sensor 10 can be fixed in the desired rotational orientation, which is the desired angular position about its axis (FIG. 10).

Also for adjusting the vertical position (lengthwise position) of the sensor 10, the bolts 50 may be loosened to the second mode. Once the bolts are loosened, the first member 21 and the second member 22 tend to be slightly spaced apart to interpose a certain gap between them, and the fastening force to the third member 23 is reduced. As a result, the main portion 24 of the third member 23 tends to move inward with its own restoring force, and the claw portions 45, 45 of the third member 23 tend to enlarge their relative distance. Therefore, the grasping force of the claws 45 in the grooves 16 of the sensor casing 13 is reduced, and the casing 13 can be moved in its lengthwise direction to adjust the sensor 10 at a desired lengthwise position.

Figure 10:
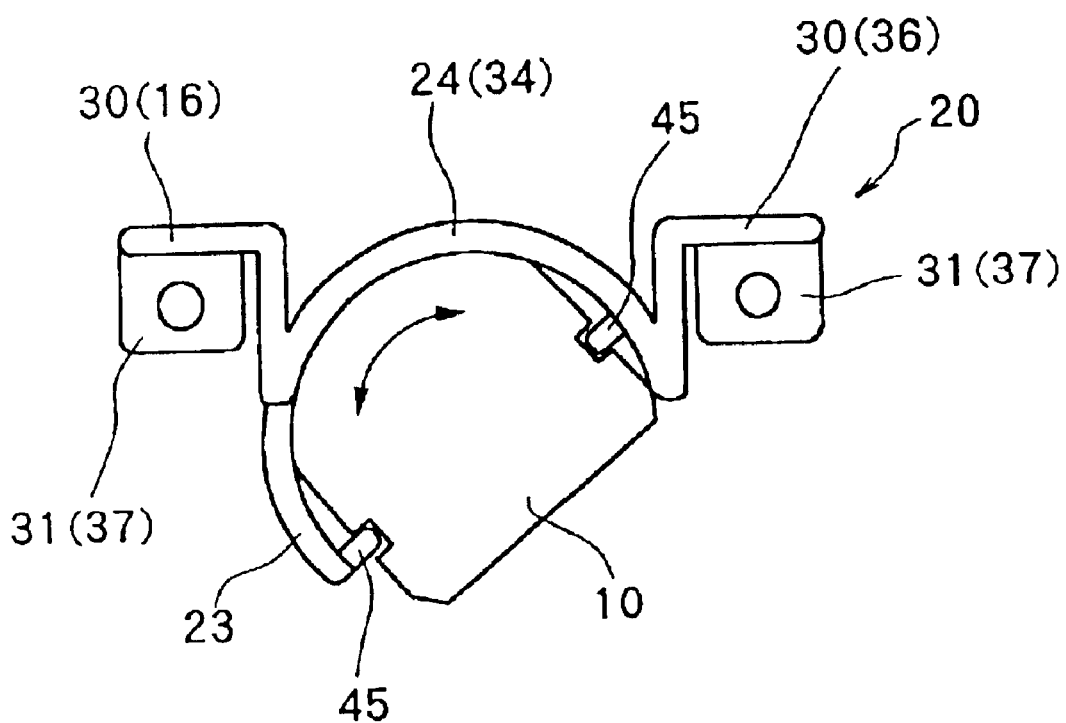
FIG. 10 is a diagram for explaining that the fixture method and the mount according to the first embodiment can adjust the rotational orientation of the multi-beam photoelectric sensor in a wide range.

As shown in FIG. 10, the back surface 15 of the sensor 10 (FIG. 3) preferably has an arcuate surface in cross section, which is complementary and fit with the arcuate central or main portion 44 of the third member 23, to ensure stable fixture of the sensor 10.

It will be appreciated from the foregoing explanation that the slanted side surface 28 of the central portion 24 of the first member 21 and the slanted side surface 40 of the central portion 34 of the second member 22 cooperate with the slanted side surfaces 48, 49 of the central portion 44 of the third member 23 to serve as guides when the third member 23 rotates. In addition to this function, the slanted side surface 28 of the central portion 24 of the first member 21 and the slanted side surface 40 of the central portion 34 of the second member 22 function to fix the third member 23 by tight and pressure contact with the slanted side surfaces 48, 49 of the central portion 44 of the third member 23.

Figure 8:
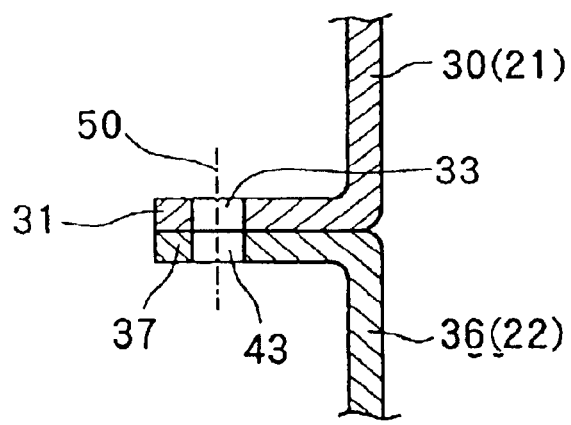
FIG. 8 is diagram that illustrates a specific example of fastening the first and second members contained in the mount according to the first embodiment.
Figure 9:
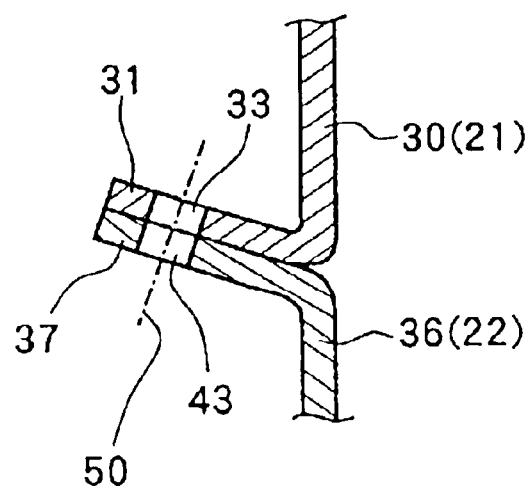
FIG. 9 is a diagram that illustrates another specific example of fastening the first and second members contained in the mount according to the first embodiment.

The flanges 31 of the first member 21 and the flanges 37 of the second member 22 may project perpendicularly from their support-engaging portions 30, 36 as shown in FIG. 8, or may project with an acute angle and a complementary obtuse angle, respectively, for their support-engaging portions 30, 36 as shown in FIG. 9.

Figure 12:
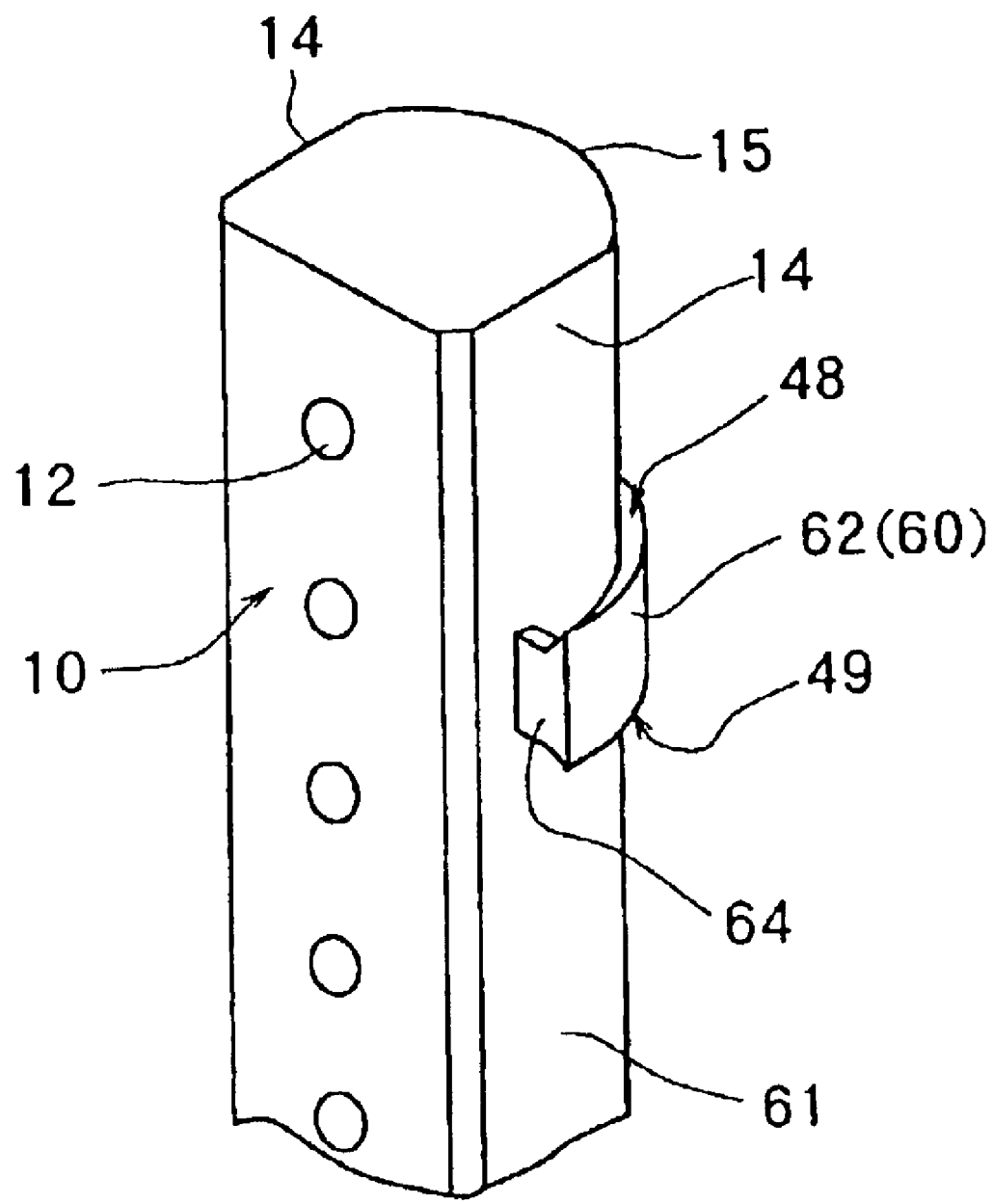
FIG. 12 is a diagram for explaining a modification of the first embodiment.

FIG. 12 et seq. show other embodiments or modifications of the invention, labeling the same or equivalent components with common reference numerals and omitting their explanation to direct the following explanation to features different from the first embodiment.

Second Embodiment (FIG. 12)

The second embodiment shown in FIG. 12 is a modification of the first embodiment as well. The mount 60 as a modification includes an arcuate, elongate projection 62 that is formed on the casing 61 of the sensor 10 to extend over the opposite sidewalls 14 of the casing 61 and the bottom or back surface 15. The projection 62 may be united to the casing main body 63 by welding, for example. In the illustrated example, the casing bottom or back wall 15 is arcuate in section, and the arcuate, elongate projection 62 extends around the casing bottom or back wall 15. However, if the casing bottom or back wall 15 is flat, then the elongate projection may be secured only with its opposite end portions 64 to the casing sidewalls 14 while leaving the central portion spaced from the casing bottom or back wall 15.

The elongate projection 62 is substantially the same as the third member 23 of the first embodiment, and includes the slanted side surfaces 48, 49. Further, although FIG. 12 does not show, the mount 60 includes the first and second members 21, 22 for engagement with a support. Thus the mount 60 composed of the projection 62, first and second members 21, 22 has substantially the same function as the mount 20 of the first embodiment.

The elongate projection 62 need not extend continuously, but may extend only within the extent of the back wall 15 of the sensor 10 or may partly extend within the extend of the back wall 15 and/or opposite side surfaces of the sensor 10.

Figure 13:
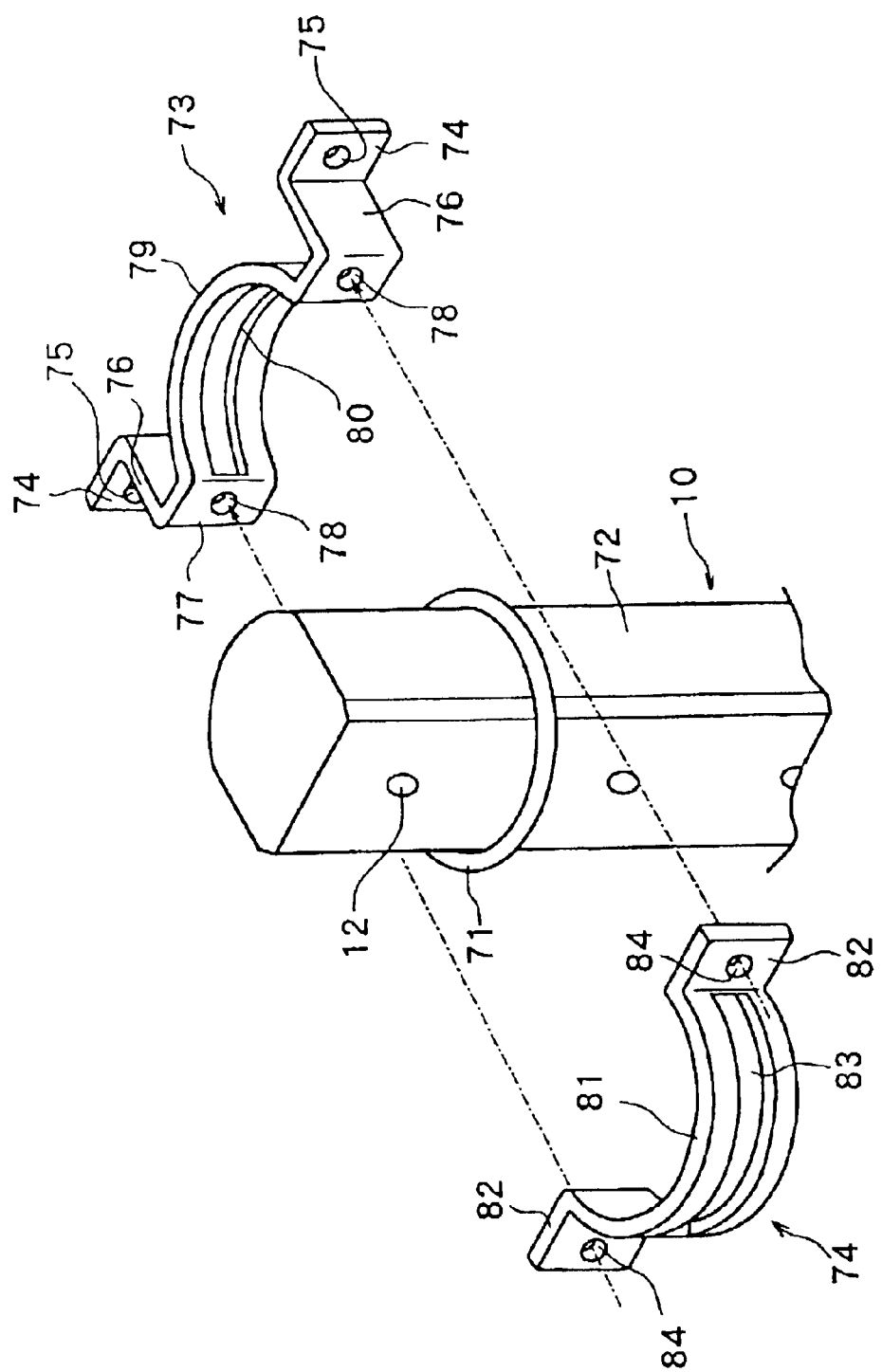
FIG. 13 is a partial, perspective view of a fixture method and a mount according to the third embodiment of the invention.

Third Embodiment (FIG. 13)

The mount 70 according to the third embodiment shown in FIG. 13 includes a circumferential ring 71 formed on the sensor 10. If the casing 72 of the sensor 10 includes a casing body that is an extrusion mold and plastic end members fixed to opposite ends of the casing body, then the circumferential ring 71 is preferably formed as an integral part of one or each of the end members.

The mount 70 according to the third embodiment includes a mount base member 73 for engagement with a support, and a fastening member 74 as a counterpart of the mount base member 73.

The mount base member 73 includes a pair of flanges as seats for contact with a support (not shown). The flanges have through holes 75. The holes may be long in the axial direction of the sensor 10 to permit a lengthwise movement of the sensor for adjustment of its lengthwise position when fastening bolts inserted through these holes 75 are loosened. The mount base member 73 further includes additional base portions 77 that form planes substantially parallel with the flanges 74 in a different level after rising or falling via rise portions 76 from opposed ends of the flanges 74. The additional base portions 74 have second bolts holes 78.

The mount base member 73 additionally includes an arcuate, elongate portion 79 extending around the back wall of the casing 72 of the sensor 10, which is arcuate in section. Opposite ends of the elongate portion 79 merge into the additional base portions 77. The arcuate, elongate portion 79 has a first slit 80 extending in its lengthwise direction for receiving a segment of the circumferential ring 71.

On the other hand, the fastening member 74 has an elongate portion 81 extending in form of an arch around a segment of the circumferential ring 71, and flanges 82 extending on a common flat plane from opposite ends of the elongate portion 81. The elongate portion 81 has a second slit 83 extending in its lengthwise direction for receiving a segment of the circumferential ring 71.

For fixing the sensor 10 with the mount 70 according to the third embodiment, the base member 73 is first fixed to a support (not shown) with bolts (not shown) inserted through the bolt holes 75 of the flanges 74 of the base member 73.

After that, the sensor 10 is assembled to position its circumferential ring 71 in engagement with the first slit 80 of the base member 73.

After that, the fastening member 74 is put on the front face of the sensor 10. After the second slit 83 of the fastening member 74 is positioned to receive a segment of the circumferential ring 71 of the sensor 10, bolts (not shown) are inserted and fastened through the bolt holes 84 in the flanges 82 of the fastening member 74 and the second bolt holes 78 in the additional base portions 77 of the base member 73. Thus the fastening member 74 is fixed to the base member 73, and the sensor 10 is fixed in a position with its back wall supported by the base member 73.

If the sensor 10 needs a rotation about its axis for adjustment of its optical axes, then the bolts fastened to fix the fastening member 73 may be loosened to allow the sensor 10 to change its rotational orientation. In this rotating motion, the circumferential ring 71 is guided by and slides in the first slit 80 of the base member 73 and the second slit 83 of the fastening member 74 to ensure the sensor 10 to rotate about its axis.

Figure 14:
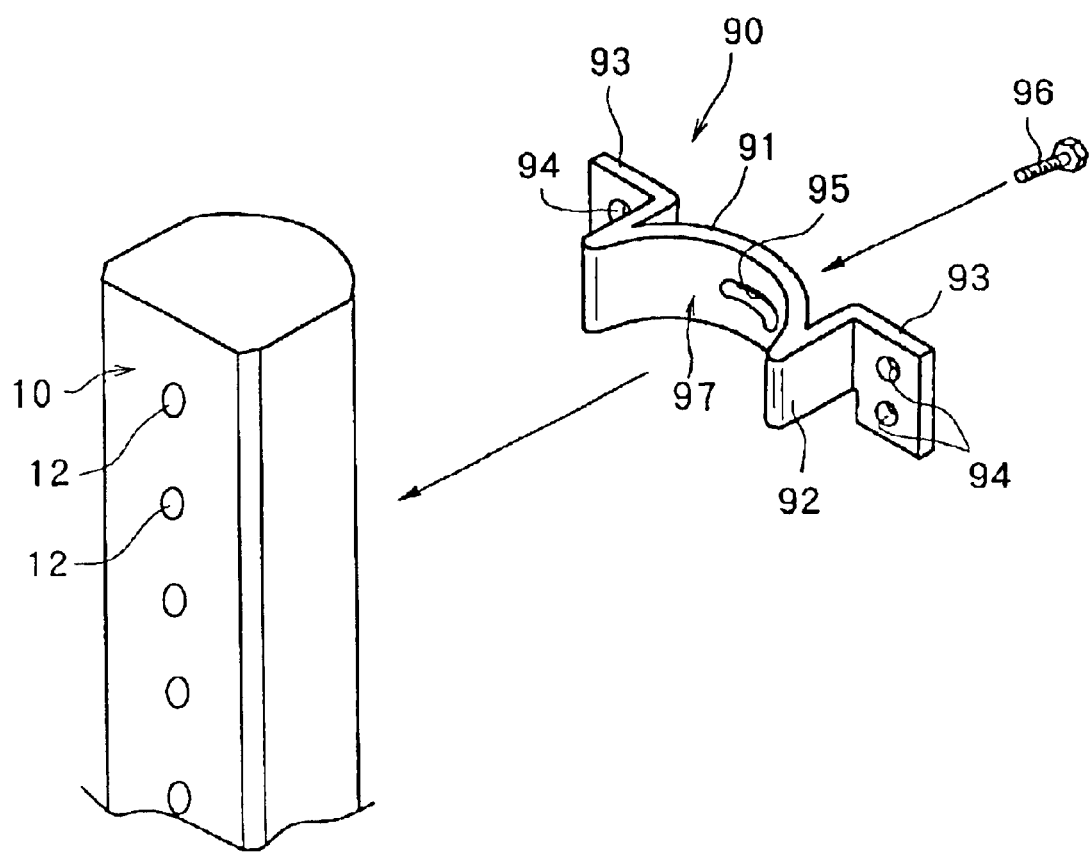
FIG. 14 is a partial, perspective view of a fixture method and a mount according to the fourth embodiment of the invention.

Fourth Embodiment (FIG. 14)

The mount 90 according to the fourth embodiment has a form substantially corresponding to, but omitting the flanges 31, 37 from, the first or second member 21, 22 (FIG. 5) of the mount 20 according to the first embodiment. More specifically, the mount 90 includes a central portion 91, rise portion 92 and support-engaging portion 93 that correspond to the central portion 24 of the first member 21, for example, rise portions 29 and support-engaging portions 30 extending flatly after being bent from respective ends of the rise portions 29, respectively. The support-engaging portions 93 have bolt holes 94, and the mount 90 as a mount base means is fixed to a support with bolts inserted through the bolt holes 94.

The inner surface 97 of the central portion 91 is arcuate in accordance with the arcuate back surface of the sensor 10. The back wall of the sensor 10 has a threaded hole at a top position although it does not appear in FIG. 14. On the other hand, the central portion 91 of the mount 90 has an elongate hole 95 extending in the lengthwise center to be longer in the lengthwise direction of the central portion 91.

After the mount 90 is fixed to a support, for example, a bolt 96 is brought into threading engagement with the threaded hole from beyond the mount 90 through the elongate hole 95. As a result, the sensor 10 is fixed in position with its back wall supported by the mount 90.

If the sensor 10 needs a change in rotational orientation for adjustment of its optical axes, then the bolt 96 may be loosened.

The mount 90 according to the fourth embodiment also engages with the back wall of the sensor 10 within the length of the sensor 10 when it fixes the sensor to a support, for example. Therefore, any number of sensors 10 can be connected closely without large gaps between every adjacent sensors, and can make a large light curtain by substantially equally spaced light beams throughout its entire area.

If the hole 95 of the mount 90 need not function as an adjustment means for the sensor 10 in its rotating direction, the hole 95 need not be elongated but may be a round bolt hole having a diameter large enough to receive the bolt 96.

In this case, the back surface of the sensor 10 may be flat, and the inner surface 97 of the may be flat accordingly.

Fifth Embodiment (FIGS. 15 through 20)

The mount 100 according to the fifth embodiment substantially comprises four members 101 through 104, and it is designed to enable adjustment of the axial position of the sensor and adjustment of the angular position of the sensor about its axis independently. In some of the foregoing embodiments including the first embodiment, the third member 23 is fixed in position by tightly holding it between the first member 21 and the second member 22 (FIGS. 3 and 4). However, in the mount 100 according to the fifth embodiment, fixture is attained by using an elongate member (third member 103 explained later) extending in parallel with a circumferential line of the sensor 10 around its back surface and biasing and urging the elongate member upwardly.

Figure 18:
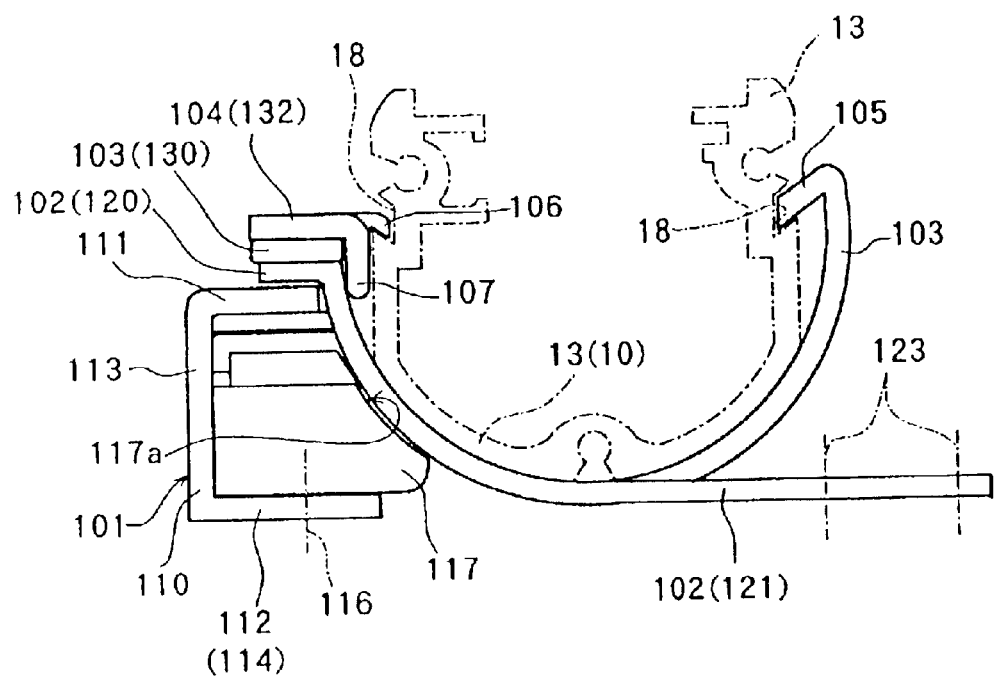
FIG. 18 is a cross-sectional view taken along the X18—X18 line of FIG. 17.
Figure 19:
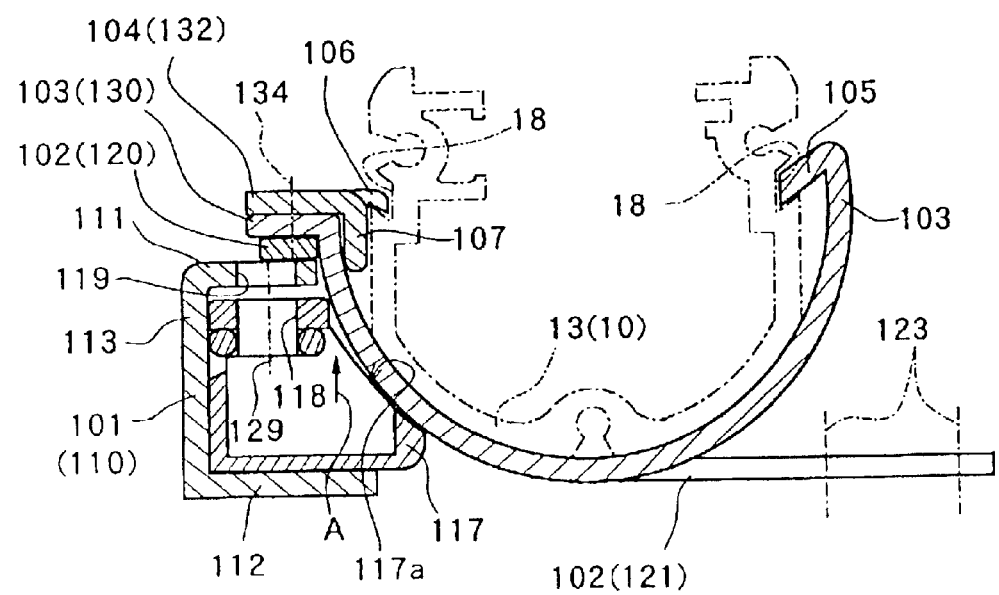
FIG. 19 is a cross-sectional view taken along the X19—X19 line of FIG. 17.

In the mount 100 of the fifth embodiment, the first member 101 and the second member 102 substantially constitutes a mount base for fixing the mount 100 to a support (not shown). The third member 103 is a metal plate having an elongate shape extending over the opposite sides of the sensor 10 and its back surface. The third member 103 has a first claw portion 105 at one end thereof. The first claw portion 105 engages with one of the grooves 16 of the sensor casing 13 (FIGS. 18 and 19). The fourth member 104 has a second claw portion 106 for engagement with the other groove 16 of the sensor casing 13, and preferably has a wedge portion 107 adjacent to the second claw portion 106 (FIGS. 18 and 19).

When the second claw portion 106 of the fourth member 104 and the fist claw portion 105 of the third member 10 engage with the grooves 16 of the sensor casing 13, the third member 103 and the fourth member 104 cooperate with each other to form a sensor support mechanism extending over the back surface and opposite side surfaces of the sensor casing 13.

Figure 15:
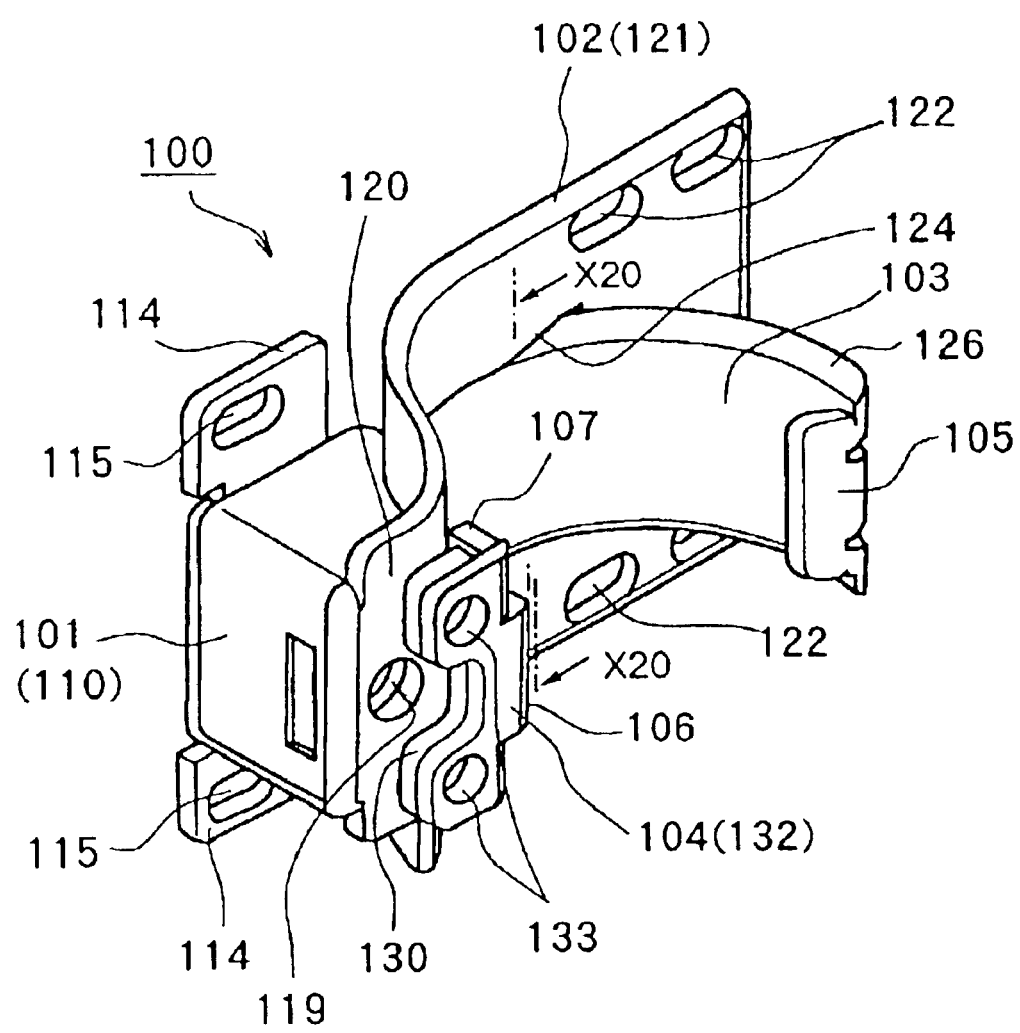
FIG. 15 is a perspective view of a mount according to the fifth embodiment, taken from one direction.

In greater detail, the first member 101 includes a main body 110 opened toward the sensor 10. As best shown in FIGS. 18 and 19, the main body 110 has a channel-shaped cross section including a top wall 111, a bottom wall 112 parallel to the top wall 111 and a single sidewall connecting the top and bottom walls 111, 112 on one side remoter from the sensor 10. As best shown in FIG. 15, the bottom wall 112 of the main body of the first member 101 has a pair of first flanges 114 having elongate holes 115 longer in a direction parallel to a circumferential line of the sensor 10. Bolts 116 are inserted through the elongate holes 115 (FIG. 18) to fix the first member 101 to a support.

As best shown in FIGS. 18 and 19, the main body 110 of the first member 101 houses a pressure-contact block or stopper 117 to partly project toward the sensor 10. The stopper 117 has a threaded hole 118 (FIG. 19) opened upwardly. The stopper 117 has an engagement surface 117a slanted to slope down from near the top wall 111 of the main body 101 toward the bottom wall 112. Functions of the engagement surface 117a will be explained later. The threaded hole 118 of the stopper 117 aligns with a round hole 119 formed in the center of the top wall 111 of the first member 101 (FIG. 19).

The second member 102 is a single metal plate having a second flange 120 extending in parallel with the top wall of 111 of the first member 101, and a main body 121 that curves downward from the second flange 120, next curves oppositely along one side surface of the sensor 10 and then extends straight away from the first member 101 in the same level as the bottom wall 112 of the first member 101. The second flange 120 has a bolt hole 120H aligned with the round hole 119 of the top wall 111 of the first member 101 to receive a bolt 129 therethrough. Near the free end of the main body 121, it has a plurality of elongate holes 122 longer in a direction in parallel to a circumferential line of the sensor 10. The elongate holes 122 receive bolts 123 (FIGS. 18 and 19) for fixing the second member 102 to a support.

Figure 20:
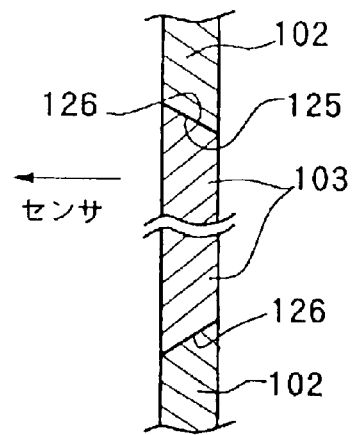
FIG. 20 is a partial, cross-sectional view taken along the X20—X20 lines of FIGS. 15 and 16.

The main body 121 of the second member 102 has an elongate, rectangular opening 124 (FIG. 15) in its central area to extend in parallel with a circumferential line of the sensor 10. As best shown in FIG. 20, which is a cross-sectional view taken along the X20—X20 line of FIG. 15, lengthwise central portions of the rectangular opening 124 are defined by slanting surfaces 125 sloping down from the back surface of the main body 121 toward the inner surface thereof facing to the sensor 10. On the other hand, opposite side surfaces of the third member 103 are shaped as second slanting surfaces 126 that are slanted by complementary angles with those of the first slanting surfaces 125. That is, the second slanting surfaces 126 of the third member 103 are slanted to slope down radially inward. Opposite lengthwise ends of the rectangular opening 124 of the second member 102 are slightly widened to receive the third member 103 therein.

As already explained, the third member 103 has an elongate shape extending over the opposite side surfaces and back surface of the sensor 10 (casing 13), and includes the claw portion 105 at one end. The third member 103 additionally includes a third flange 130 extending along the second flange 120 of the second member 102 from the other end opposite from the claw portion 105, which is nearer to the second member 102. The third flange 130 of the third member 103 has a pair of threaded holes (not shown) that are spaced in the axial direction of the sensor 10.

As already explained, the fourth member 104 includes the second claw portion 106 for engagement with the other groove 16 of the sensor casing 13, and preferably includes the wedge portion adjacent to the claw portion 106. The fourth member further includes a main body 132 in form of a flange overlying the third flange 130 of the third member 103. The main body 132 has a pair of round bolt holes 133 in alignment with the pair of threaded holes (not shown) of the third flange 130. The third member 103 and the fourth member 104 are united together by bolts 134 (FIG. 19) brought into threading engagement with the threaded holes (not shown) of the third flange 130 (third member 103) through the bolt holes 133 in the main body of the fourth member 104.

Figure 16:
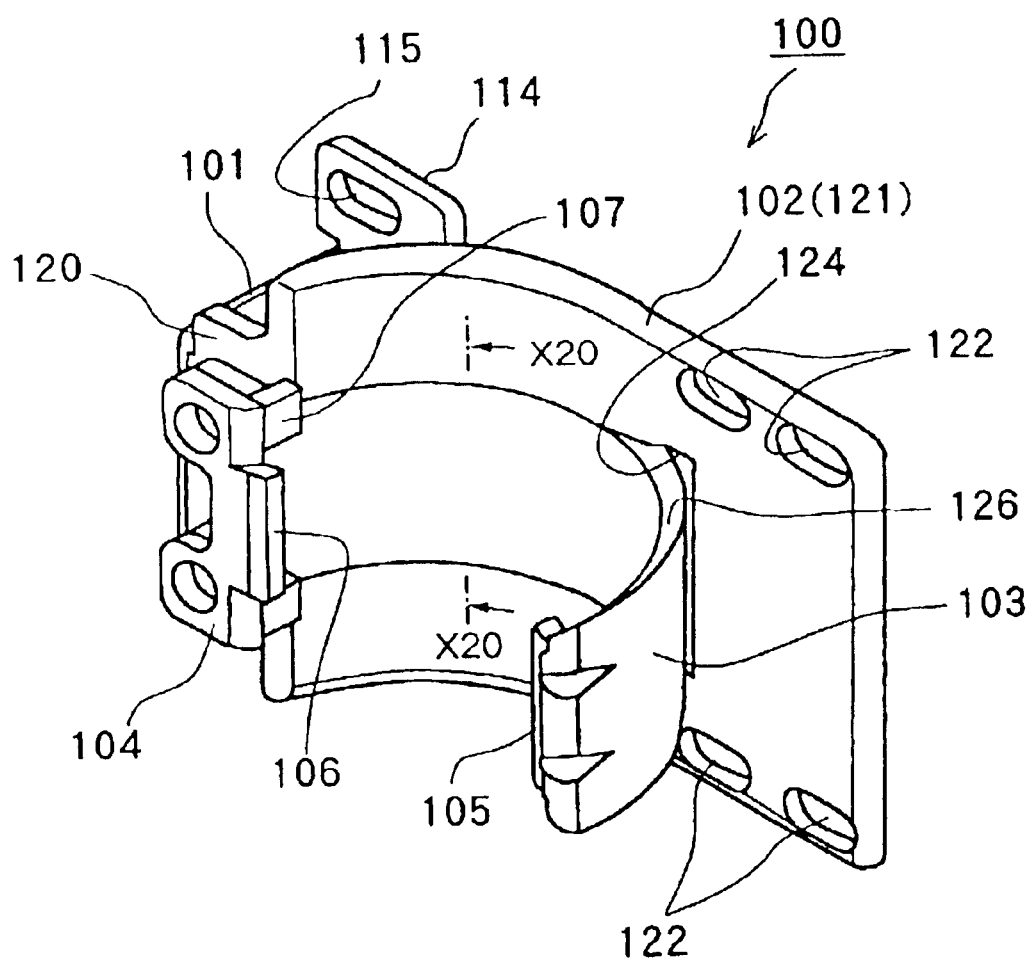
FIG. 16 is a perspective view of the mount according to the fifth embodiment, taken from another direction.
Figure 17:
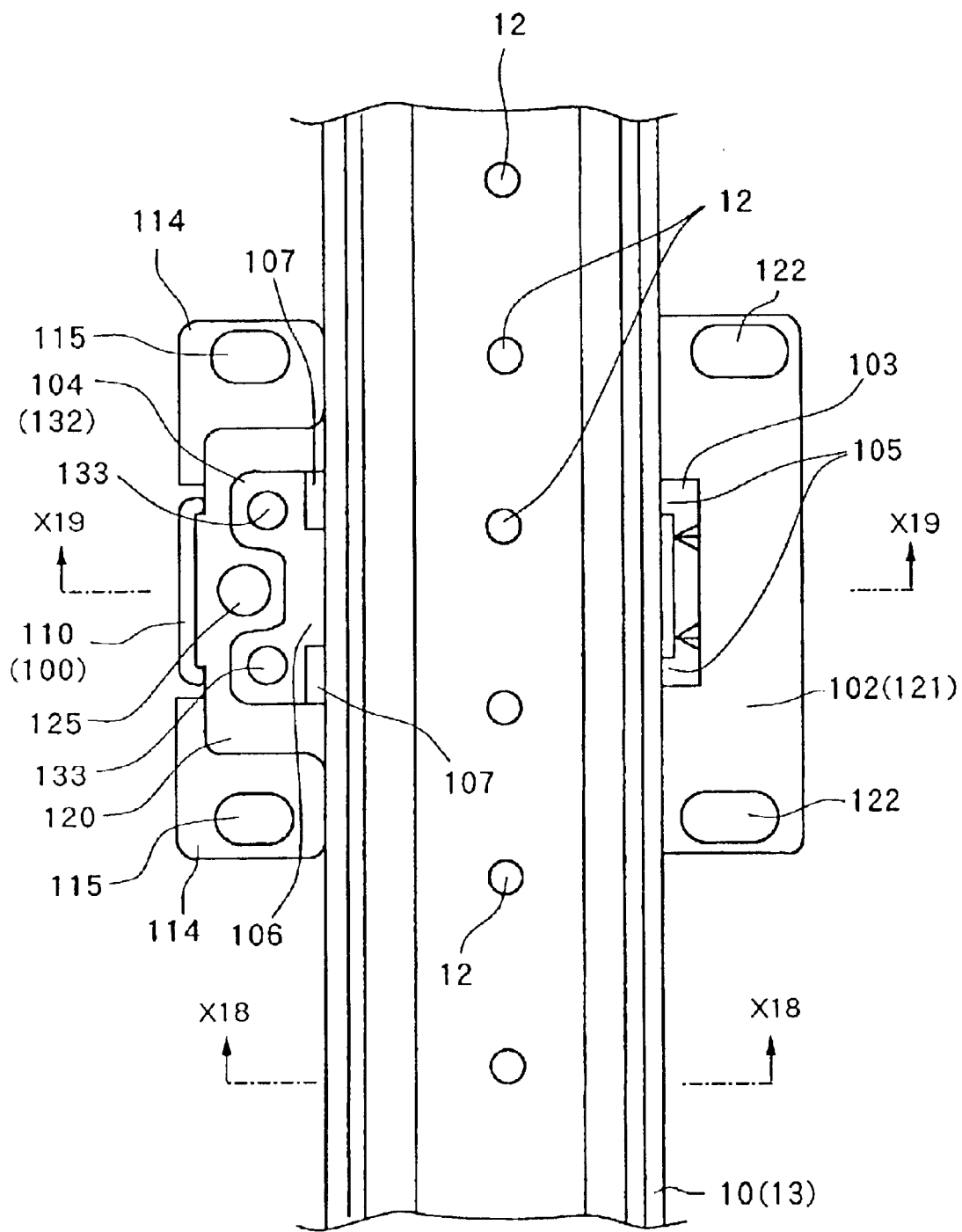
FIG. 17 is a partial, front elevation that shows a multi-beam photoelectric sensor mounted to a support with the mount according to the fifth embodiment.

The mount 100 according to the fifth embodiment explained above is used by first fixing the first member 101 to a support with bolts 116 (FIG. 16). Separately, the third member 103 and the fourth member 104 are united together with bolts 134, with their claw portions 105, 106 in engagement with the grooves 16 of the sensor casing 13 (FIG. 19). As the bolts 134 are fastened, the wedge portion 107 of the fourth member 104 enters deeper and deeper in the gap between the third member 103 and the sensor casing 13 (FIGS. 18 and 19). As a result, the sensor case 13 and the third member 103 are united more firmly. Before or after this process, the second member 102 is fixed to the support with the bolts 123 (FIG. 19).

Before or after the semi-assembly of the third and fourth members 103, 104 to the sensor casing 13, the third member 103 is partly inserted in the rectangular opening 124 of the second member 102 (FIG. 15). This step can be carried out by inserting the third member 103 from one end of the rectangular opening 124 nearer to the first member 101, i.e. nearer to the second flange 120 of the second member 102.

After that, the second member 102 is fixed to the first member 101 with the bolt 129 (FIG. 19). As the bolt 129 is rotated in the fastening direction, the stopper 117 rises as shown by the arrow A in FIG. 18. As a result of the upward movement of the stopper 117, its slanting surface 117a engages with the third member 103, and urges the third member 103 such that its slanting side surfaces 126 tightly engage with the slanting side surfaces 125 defining the rectangular opening 124 of the second member 102. Thus the third member 103 is fixed in position.

The sensor 10 can be adjusted in lengthwise position by first loosening the bolts 134 to loosen the engagement of the claw portions 105, 106 of the third and fourth members 103, 104 with the grooves of the sensor casing 13, next changing the positions of the claw portions 105, 106 relative to the grooves in their lengthwise direction, and finally fastening again the bolts 134 (FIG. 19).

The sensor 10 can be adjusted in rotational orientation about its axis by loosening the bolt 129 other than the bolts 134, independently from its adjustment in its lengthwise position. When the bolt 129 is loosened, the stopper 117 moves down, and removes the urging force of the stopper 117 to the third member 103. As a result, the slanting surfaces 126 of the third member 103 and the slanting side surfaces 125 defining the rectangular opening 124 of the second member 102 are released from the tight engagement, and the sensor 10 is permitted to rotate. During this rotation, the sensor 10 is guided by the first slanting side surfaces 125 defining the rectangular opening 124 of the second member 102 (FIGS. 15 and 16).

In the fifth embodiment explained above, if the function of positional adjustment of the sensor 10 in its lengthwise direction may be omitted, the third member 103 may be formed as an integral part of the sensor casing 13. In this case, the third member 103 can be fixed by urging it with the stopper 117 from the back surface of the third member 103. When the raising force from the stopper 117 is reduced, the third member 103 is permitted to rotate, and the sensor 10 can be rotated to a desired angular position for adjustment of its rotational orientation.

Figure 21:
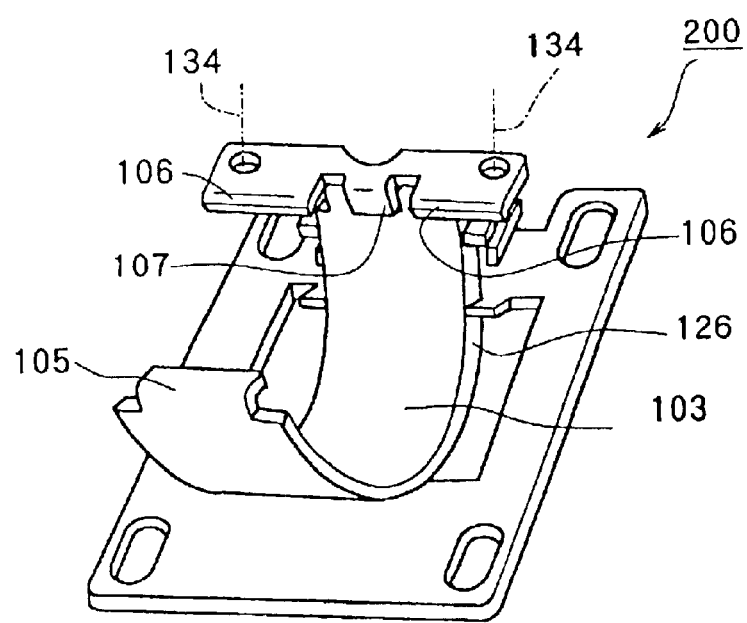
FIG. 21 is a perspective view of a mount according to the sixth embodiment of the invention.
Figure 22:
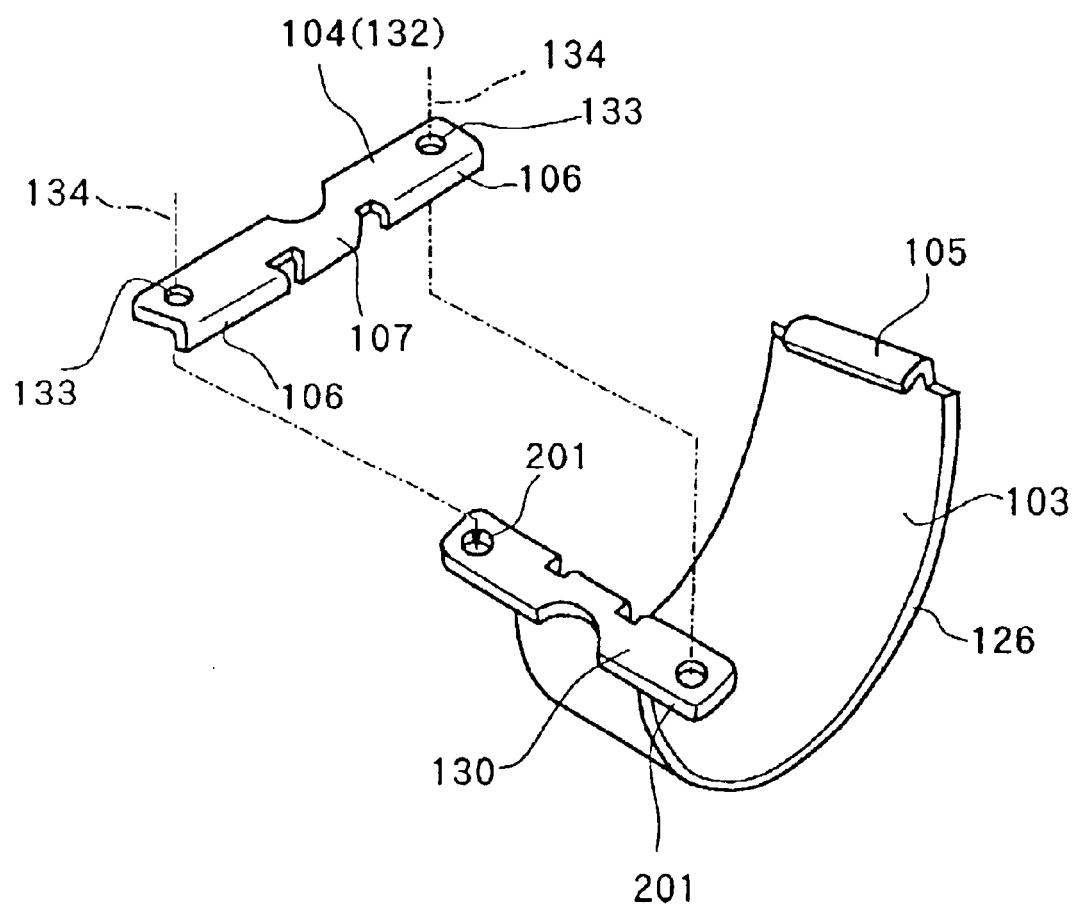
FIG. 22 is an exploded, perspective view of an elongate third member contained in the sixth embodiment and a complementary fourth member.
Figure 23:
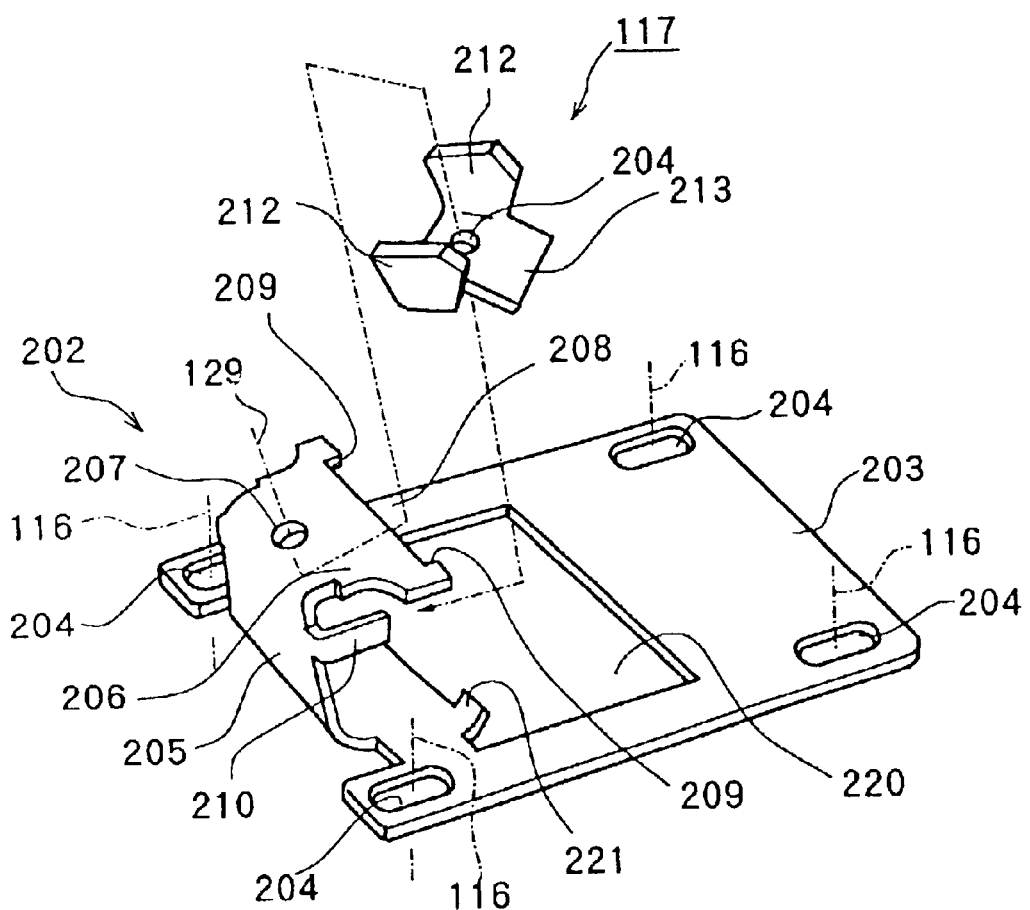
FIG. 23 is an exploded, perspective view of a base member contained in the sixth embodiment and a stopper member received therein.

Sixth Embodiment (FIGS. 21 through 23)

The mount 200 according to the sixth embodiment is a modification of the mount 100 according to the fifth embodiment explained above (FIGS. 15 through 20). Among components of the mount 200 according to the sixth embodiment, substantially the same components as those of the mount 100 according to the fifth embodiment are labeled with common reference numerals to substantially concentrate the following explanation to features of the sixth embodiment.

Similarly to the fifth embodiment, the mount 200 according to the sixth embodiment includes the third member 103 extending over the opposite side surfaces and the back surface of the sensor 10, and the fourth member 104. These members 103, 104 have substantially the same structures as those of the fifth embodiment. Although the threaded holes of the fourth member 104 do not appear in FIGS. 15 through 20 showing the fifth embodiment, they appear in FIG. 22 with the reference numeral 201.

Opposite side surfaces of the elongate third member curving around the back surface of the sensor 10 are similarly slanted as the fifth embodiment to form slanting side surfaces 126.

The mount 200 according to the sixth embodiment further includes a base member made of a single metal plate. The base member 202 substantially functions as both the first member 101 and the second member 102 of the fifth embodiment.

In greater detail, as best shown in FIG. 23, the base member 202 includes a base plate portion 203 having an approximately rectangular outer contour. The base plate portion 203 has elongate holes 204 in its four corner regions. The elongate holes 204 receive bolts 116 for fixing the base member 202 to a support (not shown).

The base plate portion 203 has a rise portion 205 at one end. The top end portion of the stand portion 205 is bent toward the opposite end of the base plate portion 203 to form a flange portion 206. The flange portion 206 extends approximately in parallel with the base plate portion 203, and has a round hole 207 in its central area. The end surface of the flange portion 206 defines a recess 208 that is equal in width to the elongate third member 103. The depth of the recess 208, which is the length of claw portions 209 at opposite sides of the recess 208, is approximately equal to the thickness of the elongate third member 103. The pair of claw portions 209 forming sidewalls of the recess 209 are slanting surfaces slanted by a complementary angle with the slanting side surfaces 126 of the third member 103.

The rise portion 205 includes a pair of right and left arms 210 (only one being shown in FIG. 23) in a middle level.

The base member 202 houses a stopper 117 in the space made by the base plate portion 203, rise portion 205 and flange portion 206. The stopper 117 is made of a single metal plate, and includes a pair of right and left sidewalls 212 and a tong portion 213 extending to slope down. The stopper 117 has a threaded hole 204 in central area. FIG. 23 shows the base member 202 and the stopper 117 in orientations best showing their features, and these orientations are different from their orientations for their assembly.

When a bolt 129 inserted through the round hole 207 of the flange 206 is driven into threading engagement with the threaded hole 204 of the stopper 117, the stopper is joined to the base member 202.

The base member 202 has a rectangular opening 220 in a central area of the base plate portion 203. Along one of the side edges of the opening 202 nearer to the rise portion 205, a pair of second claw portions 221 (only one being illustrated) are formed. These claw portions 221 are spaced by a distance equal to the width of the third member 103, and have a length equal to the thickness of the elongate third member 103. Opposed surfaces of the claw portions 221 are slanting surfaces slanted by a complementary angle with the slanting side surfaces 126 of the third member 103.

In the mount 200 according to the sixth embodiment, the elongate third member 103 is joined to the base 202 to be grasped by the two pair of claw portions 209, 221. When the bolts 134 are driven in the fastening direction, the wedge portion 107 of the fourth member 104 enters deeper and deeper in the gap between the third member 103 and the sensor casing 13 to unite the sensor casing 13 and the third member 103 more firmly in the same manner as the fifth embodiment. When the bolts 134 are loosened, engagement between the sensor casing 13 and the third member 103 is released, and the sensor casing 13 can be moved to a desired axial position together with the sensor 10.

Again similarly to the fifth embodiment, when the bolt 129 is driven in the fastening direction, the stopper 117 rises, and the tong portion 213 of the stopper 117 urges the back surface of the sensor casing 13 upward. As a result, the slanting side surfaces 126 of the elongate third member 103 already joined to the sensor 10 firmly engage with the two pairs of claw portions 209, 221, and fix the sensor in a certain rotational orientation. When the bolt 129 is loosened, the engagement force of the slanting side surfaces 126 of the third member 103 with the two pairs of claw portions 209, 221 is weakened, and the sensor 10 is permitted to rotate under the guide of the two pairs of claw portions 209, 221. Once the sensor 10 is rotated to a desired position, the bolt 129 may be fastened to fix the sensor 10 at the desired angular position.

Although the mount 200 according to the sixth embodiment has substantially the same functions as those of the fifth embodiment, it is more advantageous for smoothing rotation of the sensor 10 upon adjustment of its rotational orientation because the two pairs of claw portions 209, 221 having relatively small contact areas guide the rotation of the sensor.

Also in the sixth embodiment, if the function of adjusting the axial position of the sensor 10 is omitted, then the third member 103 may be formed as an integral part of the sensor casing 13.

Figure 24:
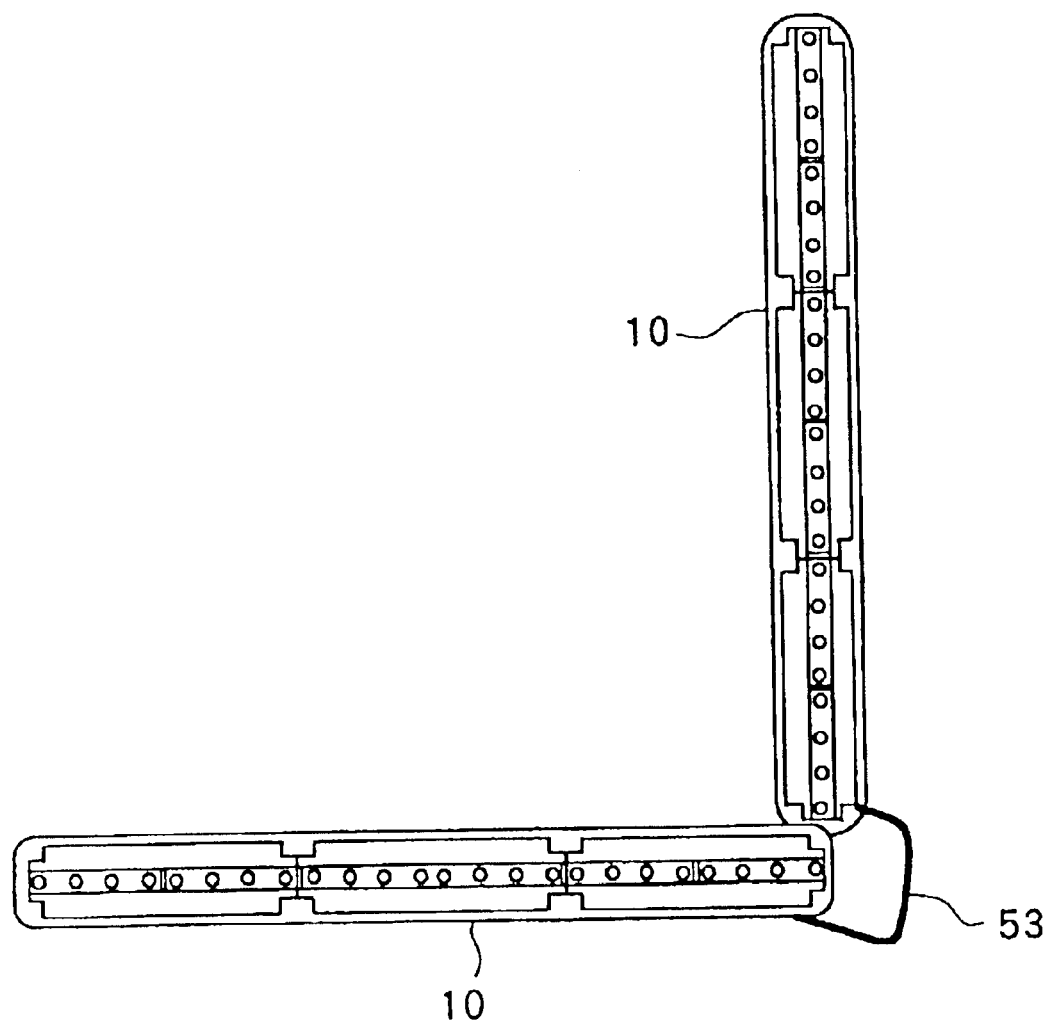
FIG. 24 is a diagram for explaining advantages obtained by making a light curtain with a mount according to the invention.

It will be appreciated from the foregoing explanation of the first to sixth embodiments that any of the mounts according to the invention uses the back surface of the sensor 10 when fixing it to a support. Therefore, as shown in FIG. 24, any number of sensors 10 can be connected to position their adjacent ends very closely to make a light curtain without a large gap of light beams between every adjacent sensors.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The texts of Japanese priority applications no. 2001-378500 filed Dec. 12, 2001 and no. 2002-275138 filed Sep. 20, 2002 are hereby incorporated by reference.

What is claimed is:

1. A multi-beam photoelectric sensor comprising:

a light emitter having a plurality of light emitting elements aligned in equal intervals in the lengthwise direction of an elongate casing inside the elongate casing;

a photo detector having a plurality of photo detector elements aligned in the same equal intervals as those of the light emitting elements in the lengthwise direction of an elongate casing inside the elongate casing;

a cable connected to at least one of lengthwise ends of the casing of the light emitter to supply an electric power and/or transmit a signal;

a cable connected to at least one of lengthwise ends of the casing of the photo detector to supply an electric power and/or transmit a signal;

a light emitter mounting means for mounting the casing of the light emitter to a support, said light emitter mounting means being positioned on a back surface of the casing of the light emitter opposite from a light emitting surface from which the light emitting elements emit light beams; and a photo detector mounting means for mounting the casing of the photo detector to a support, said photo detector mounting means being positioned on a back surface of the casing of the photo detector opposite from a photo-detecting surface where the photo detector elements receive light beams.

2. The multi-beam photoelectric sensor according to claim 1 wherein the light emitter mounting means and the photo detector mount means include means for adjusting rotational angular positions of the light emitter and the photo detector.

3. The multi-beam photoelectric sensor according to claim 1 wherein the light emitter mounting means and the photo detector mounting means are positioned apart from interference with the cables.

4. The multi-beam photoelectric sensor according to claim 1 wherein at least one of the light emitter mounting means and the photo detector mounting means includes means for adjusting the corresponding elongate casing in rotational angular position about a lengthwise axis thereof.

5. The multi-beam photoelectric sensor according to claim 4 wherein the light emitter mounting means and the photo detector mounting means include guide means for guiding rotation of the casing of the light emitter and the casing of the photo detector upon adjustment of rotational positions of the light emitter and the photo detector.

6. The multi-beam photoelectric sensor according to claim 4 wherein the light emitter mounting means and the photo detector mounting means include means for adjusting lengthwise positions of the light emitter and the photo detector.

7. A multi-beam photoelectric sensor comprising:
a light emitter having a plurality of light emitting elements aligned in equal intervals in the lengthwise direction of an elongate casing inside the elongate casing;
a photo detector having a plurality of photo detector elements aligned in the same equal intervals as those of the light emitting elements in the lengthwise direction of an elongate casing inside the elongate casing;
a light emitter mounting means for mounting the casing of the light emitter to a support, said light emitter mounting means being positioned on a back surface of the casing of the light emitter opposite from a light emitting surface from which the light emitting elements emit light beams;
a photo detector mounting means for mounting the casing of the photo detector to a support, said photo detector mounting means being positioned on a back surface of the casing of the photo detector opposite from a photo-detecting surface where the photo detector elements receive light beams;
said light emitter mounting means and said photo detector mounting means including rotational position adjusting means for adjusting rotational angular positions of the light emitter and the photo detector; and
said light emitter mounting means and said photo detector mounting means including lengthwise position adjusting means for adjusting lengthwise positions of the light emitter and the photo detector.

8. The multi-beam photoelectric sensor according to claim 7 wherein the rotational position adjusting means and the lengthwise position adjusting means are made of common members.

9. The multi-beam photoelectric sensor according to claim 7 wherein the rotational position adjusting means and the lengthwise position adjusting means are made of different members.

10. The multi-beam photoelectric sensor according to claim 7 wherein the light emitter mounting means and the photo detector mounting means include guide means for guiding rotation of the casing of the light emitter and the casing of the photo detector upon adjustment of rotational positions of the light emitter and the photo detector.

11. The multi-beam photoelectric sensor according to claim 7 further comprising;
a cable connected to at least one of lengthwise ends of the casing of the light emitter to supply an electric power and/or transmit a signal; and
a cable connected to at least one of lengthwise ends of the casing of the photo detector to supply an electric power and/or transmit a signal.

12. The multi-beam photoelectric sensor according to claim 7 wherein the light emitter mounting means and the photo detector mounting means are positioned apart from interference with a cable.

13. A mount for mounting one of a light emitter and a photo detector of a multi-beam photoelectric sensor to a support, said light emitter having a plurality of light emitting elements aligned in equal intervals in the lengthwise direction of an elongate casing inside the elongate casing and said photo detector having a plurality of photo detector elements aligned in the same equal intervals as those of the light emitting elements in the lengthwise direction of an elongate casing inside the elongate casing, comprising:
said casing having an arcuate portion which projects outwardly at least around the back surface of the circumferential surface of the casing excluding the front surface of the casing;
said mount including a first member and a second member positioned to hold the arcuate portion of the casing therebetween; and
said first member and said second member including fastening means capable of tightly joining each other.

14. The mount according to claim 13 wherein the arcuate portion is a member separate from the casing.

15. The mount according to claim 14 wherein side surfaces of the arcuate portion defining the arcuate portion in the lengthwise direction of the casing are slanting surfaces tapered to slope down toward the inner circumferential surface of the arcuate portion, and one of opposite side surfaces of the first member and one of opposite side surfaces of the second member opposed to the side surfaces of the arcuate portion are slanting surfaces tapered to slope down toward the outer circumferential surfaces.

16. A mount for mounting one of a light emitter and a photo detector of a multi-beam photoelectric sensor to a support, said light emitter having a plurality of light emitting elements aligned in equal intervals in the lengthwise direction of an elongate casing inside the elongate casing, and said photo detector having a plurality of photo detector elements aligned in the same equal intervals as those of the light emitting elements in the lengthwise direction of an elongate casing inside the elongate casing, comprising:
said casing having an arcuate portion which extends perpendicularly to the lengthwise direction of the casing, said arcuate portion having opposite side surfaces which define the arcuate portion in the lengthwise direction of the casing and form first slanting surfaces sloping down toward the inner circumferential surface thereof;
said mount having a rectangular opening which partly receives the arcuate portion of the multi-beam photoelectric sensor, opposite side surfaces of the rectangular opening being second slanting surfaces slanted with a complementary angle with the first slanting surfaces of the arcuate portion; and
said mount having a stopper for urging the arcuate portion from the back surface thereof.

17. A mount for mounting one of a light emitter and a photo detector of a multi-beam photoelectric sensor to a support, said light emitter having a plurality of light emitting elements aligned in equal intervals in the lengthwise direction of an elongate casing inside the elongate casing, and said photo detector having a plurality of photo detector elements aligned in the same equal intervals as those of the light emitting elements in the lengthwise direction of an elongate casing inside the elongate casing, comprising:

a first member which can be fixed to the support;

a second member which is positioned behind the back surface of the casing and can be fixed to the support; and a third member which can be affixed to the casing to extend in an arcuate form around the back surface of the casing, wherein opposite side surfaces of the arcuate third member are first slanting surfaces sloping down toward the inner circumferential surface thereof, wherein the second member has a rectangular opening for partly receiving the arcuate third member, opposed sidewalls defining the rectangular opening are second slanting surfaces slanted by a complementary angle with the first slanting surfaces, and wherein the first member includes a stopper which exerts an urging force to the back surface of the arcuate third member, and wherein the casing can be adjusted in rotational angle about a lengthwise axis thereof by reducing the urging force of the stopper to the third member even after the casing is fixed to the external structure by the mount.

18. The mount according to claim 17 wherein the stopper can be manually changed in position inside the first member.

19. A mount for mounting one of a light emitter and a photo detector of a multi-beam photoelectric sensor to a support, said light emitter having a plurality of light emitting elements aligned in equal intervals in the lengthwise direction of an elongate casing inside the elongate casing, the elongate casing having lengthwise grooves in opposite side surfaces thereof, and said photo detector having a plurality of photo detector elements aligned in the same equal intervals as those of the light emitting elements in the lengthwise direction of an elongate casing inside the elongate casing, the elongate casing having lengthwise grooves in opposite side surfaces thereof, comprising:

a base member which can be fixed to the support;

an elongate member extending around the back surface of the casing perpendicularly to the lengthwise direction of the casing;

guide means formed as a part of the base member to engage with the elongate member and guide rotation of the casing about a lengthwise axis thereof;

a stopper member supported by the base member to engage with the elongate member; and an operation member capable of releasing the engagement of the stopper with the elongate member, wherein the casing can be adjusted in rotational position by manually operating the operation member and thereby reducing the engagement force between the stopper member and the elongate member.

20. The mount according to claim 19 wherein opposite side surfaces of the elongate member extending perpendicularly to the lengthwise direction of the casing are slanting surfaces, and the guide means guides rotation of the casing by engagement with the slanting surfaces of the elongate member.

21. The mount according to claim 20 wherein the elongate member can move with respect to the casing in the lengthwise direction of the casing, and the mount further includes a second operation means for fixing the elongate member.

22. A multi-beam photoelectric sensor comprising:

a light emitter having a plurality of light emitting elements contained in an elongate casing and aligned in the lengthwise direction of the casing in equal intervals;

a photo detector having a plurality of photo detector elements contained in an elongate casing and aligned in the lengthwise direction of the casing in substantially the same equal intervals as those of the light emitting elements;

a light emitter mounting means positioned within the full length of the light emitter casing for fixing the light emitter casing to an external structure; and a photo detector mounting means positioned within the full length of the casing for fixing the photo detector casing to an external structure.

* * * * *